US012615121B2

(12) United States Patent
Fujimori

(10) Patent No.: US 12,615,121 B2
(45) Date of Patent: Apr. 28, 2026

(54) COMMUNICATION APPARATUS AND CONTROL METHOD OF COMMUNICATION APPARATUS

(71) Applicant: CANON KABUSHIKI KAISHA, Tokyo (JP)

(72) Inventor: Yuki Fujimori, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 18/331,080

(22) Filed: Jun. 7, 2023

(65) Prior Publication Data

US 2023/0318790 A1 Oct. 5, 2023

Related U.S. Application Data

(63) Continuation of application No. PCT/JP2021/040508, filed on Nov. 4, 2021.

(30) Foreign Application Priority Data

Dec. 8, 2020 (JP) ................................. 2020-203656

(51) Int. Cl.
*H04L 5/00* (2006.01)
(52) U.S. Cl.
CPC ................................... *H04L 5/0053* (2013.01)
(58) Field of Classification Search
None
See application file for complete search history.

(56) References Cited

U.S. PATENT DOCUMENTS

2015/0288501 A1 10/2015 Kwon
2016/0248569 A1* 8/2016 Ghosh .................... H04L 1/165
(Continued)

FOREIGN PATENT DOCUMENTS

CN 101160769 A 4/2008
EP 3595218 A1 1/2020
(Continued)

OTHER PUBLICATIONS

Rojan Chitrakar, et al. (Panasonic Corporation); Multi-link Block Ack Architecture; IEEE 802.11-20/0055r2; Jan. 2020; pp. 1-10.
(Continued)

*Primary Examiner* — Benjamin Lamont
(74) *Attorney, Agent, or Firm* — Canon U.S.A., Inc., IP Division

(57) ABSTRACT

A communication apparatus compliant with the IEEE802.11 standard series comprises: first transmission unit configured to transmit a plurality of data frames to a communication partner apparatus using a plurality of links; second transmission unit configured to transmit, to the communication partner apparatus, a request frame that requests an acknowledgement (Ack) frame to the plurality of transmitted data frames; and reception unit configured to receive the Ack frame from the communication partner apparatus in response to transmitting the request frame, wherein the request frame includes sequence information about sequence numbers of a plurality of data frames transmitted on each link of the plurality of links, and the sequence information includes identification information that identifies at least one data frame group distinguished every series of data frames having consecutive sequence numbers out of the plurality of data frames transmitted on the each link.

9 Claims, 18 Drawing Sheets

(56) References Cited

U.S. PATENT DOCUMENTS

| | | | |
|---|---|---|---|
| 2017/0310424 A1 | 10/2017 | Chun et al. | |
| 2018/0084584 A1* | 3/2018 | Umehara | H04W 74/0816 |
| 2018/0338266 A1* | 11/2018 | Sakai | H04W 84/12 |
| 2020/0396568 A1* | 12/2020 | Huang | H04W 76/40 |
| 2021/0111836 A1* | 4/2021 | Huang | H04L 1/1642 |
| 2021/0211235 A1* | 7/2021 | Chu | H04L 1/1614 |
| 2022/0086722 A1* | 3/2022 | Gan | H04W 12/041 |
| 2022/0217721 A1* | 7/2022 | Sugaya | H04L 1/1642 |
| 2022/0385403 A1* | 12/2022 | Song | H04W 76/15 |
| 2023/0040554 A1* | 2/2023 | Huang | H04L 1/1621 |
| 2023/0179340 A1* | 6/2023 | Aio | H04W 76/15 |
| | | | 370/329 |

FOREIGN PATENT DOCUMENTS

| | | | |
|---|---|---|---|
| JP | 2017536004 A | 11/2017 |
| JP | 2018050133 A | 3/2018 |
| WO | 2016053024 A1 | 4/2016 |
| WO | 2020218016 A1 | 10/2020 |
| WO | 2020238812 A1 | 12/2020 |

OTHER PUBLICATIONS

Liwen Chu et al., A-MPDU and BA, IFEE 802.11-19/1856r2, Nov. 6, 2019.

* cited by examiner

F I G. 3
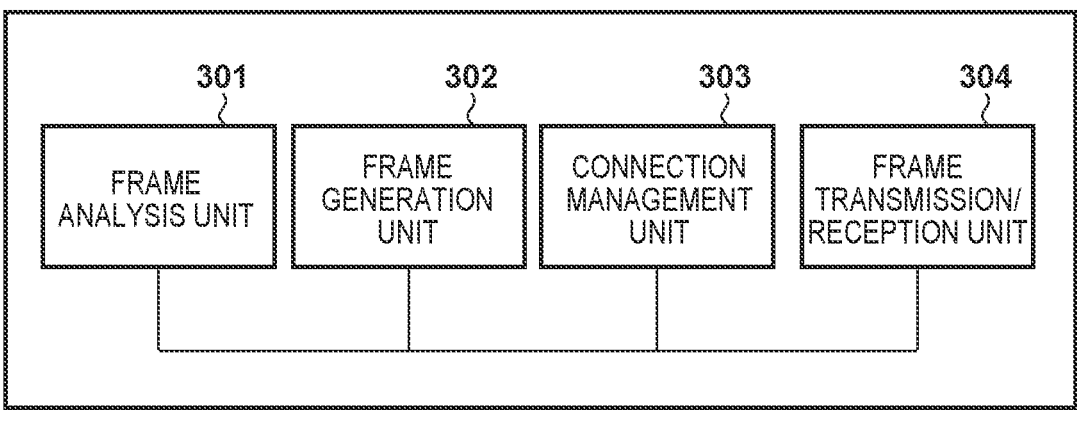

F I G. 4
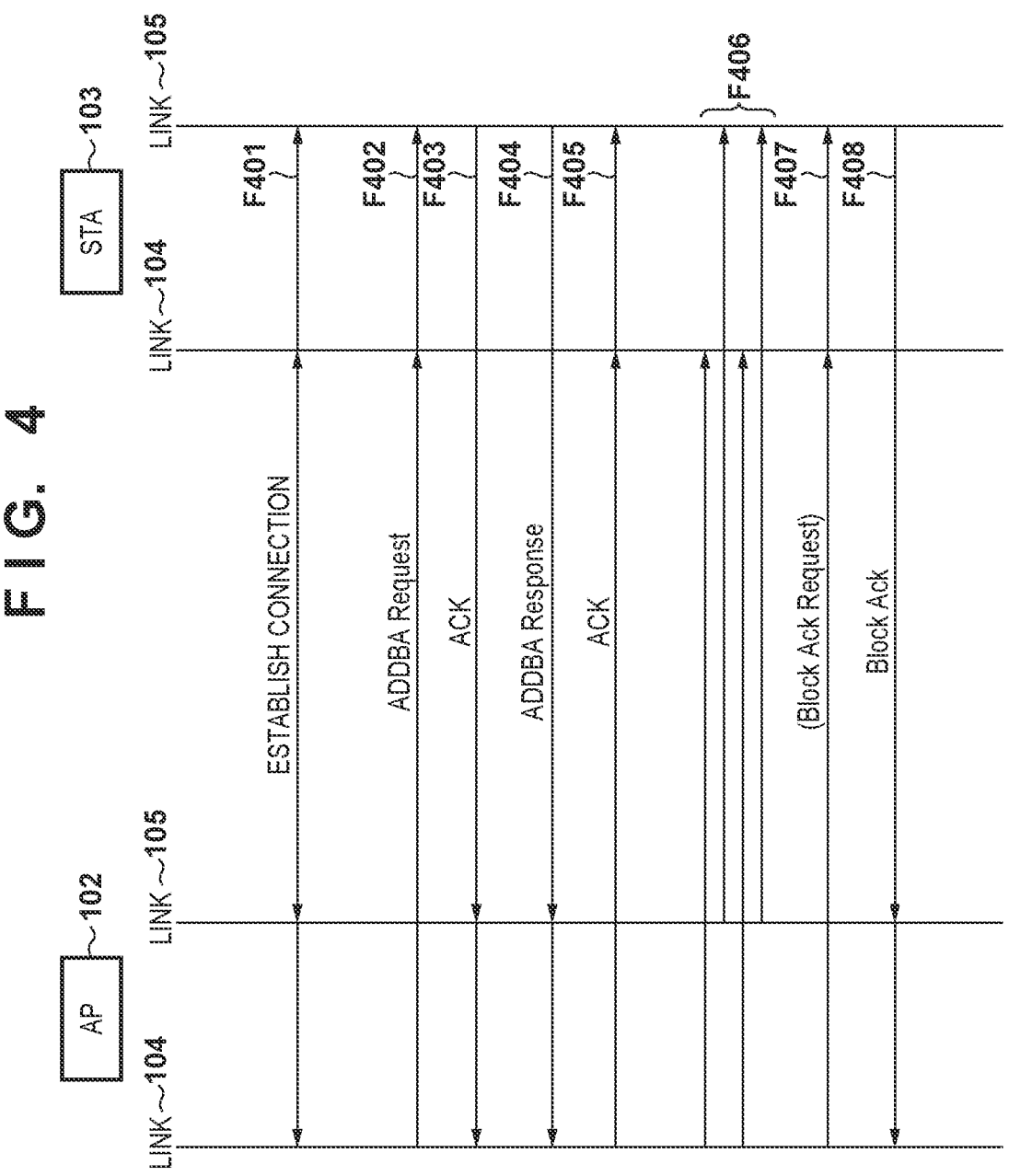

FIG. 5A
BA(R) Frame
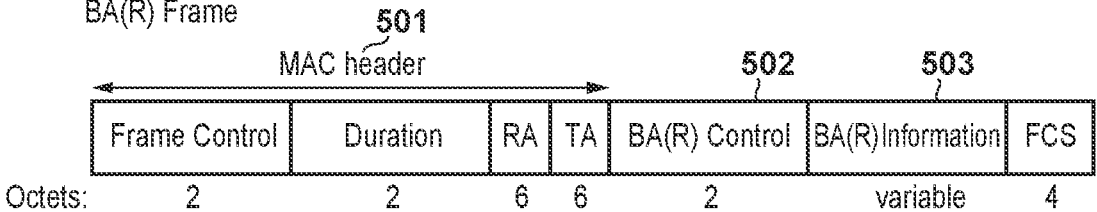
FIG. 5B
BA(R) Control field
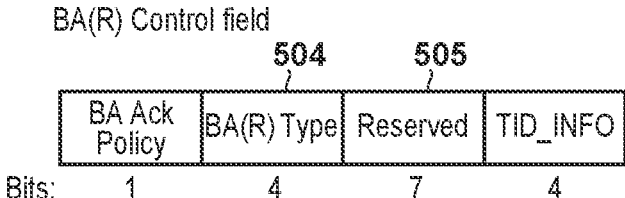
FIG. 5C
BA(R) Information field
507    506
| BA(R) Subtype | ACK Info |
|---|---|
| Bits:    0 or 4 | variable |

F I G.  6A
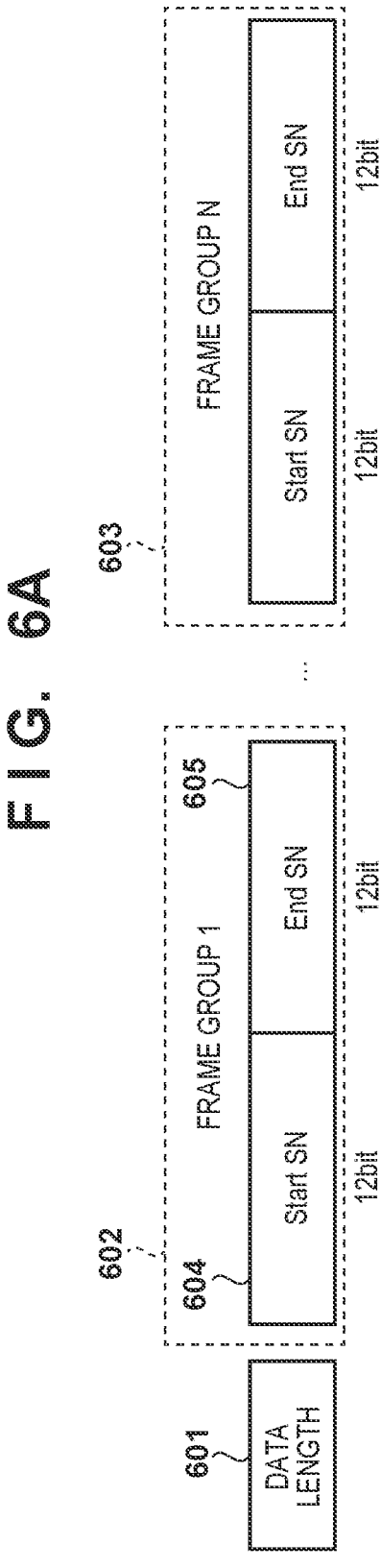

FIG. 6B

F I G. 8
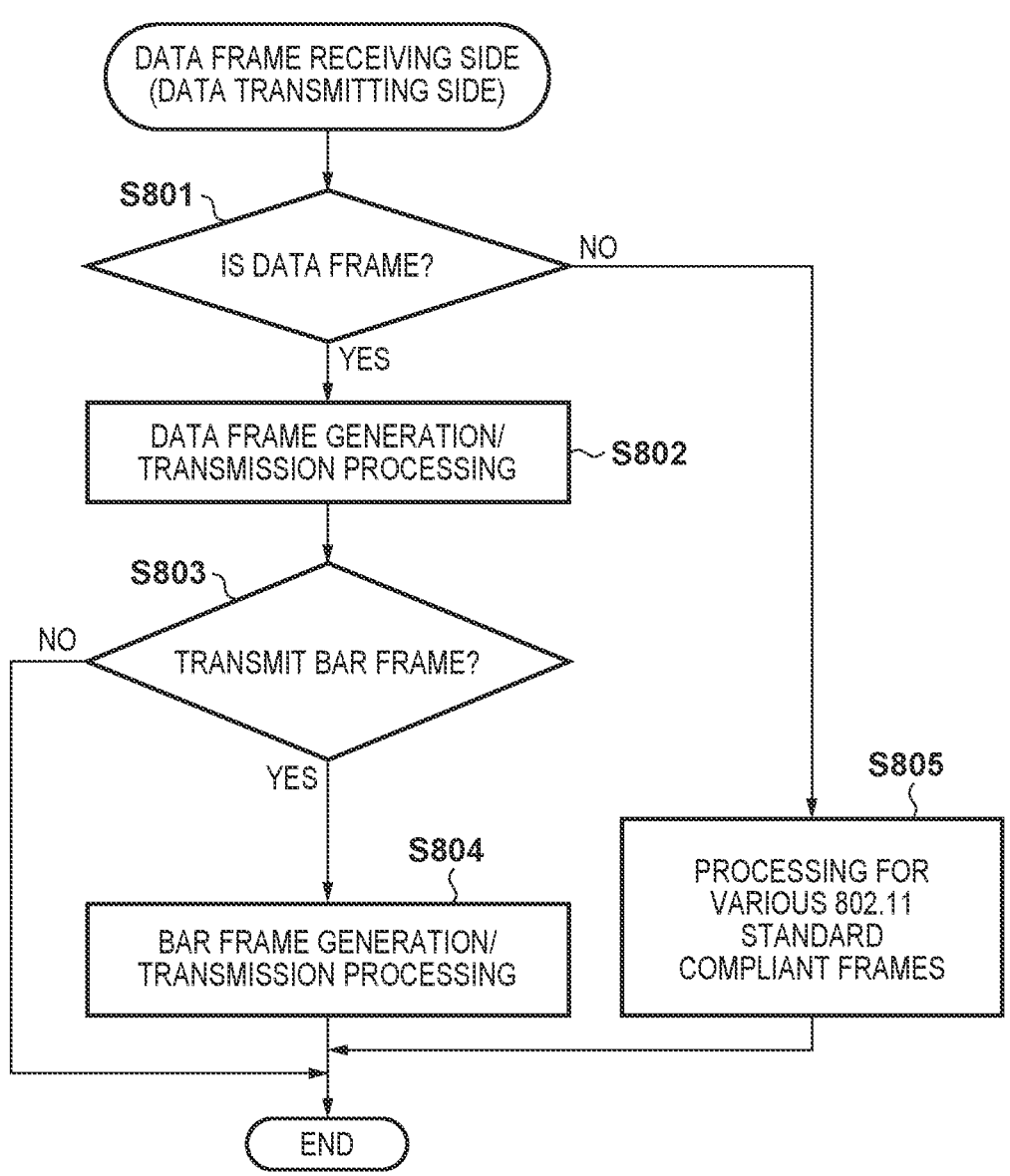

F I G. 10
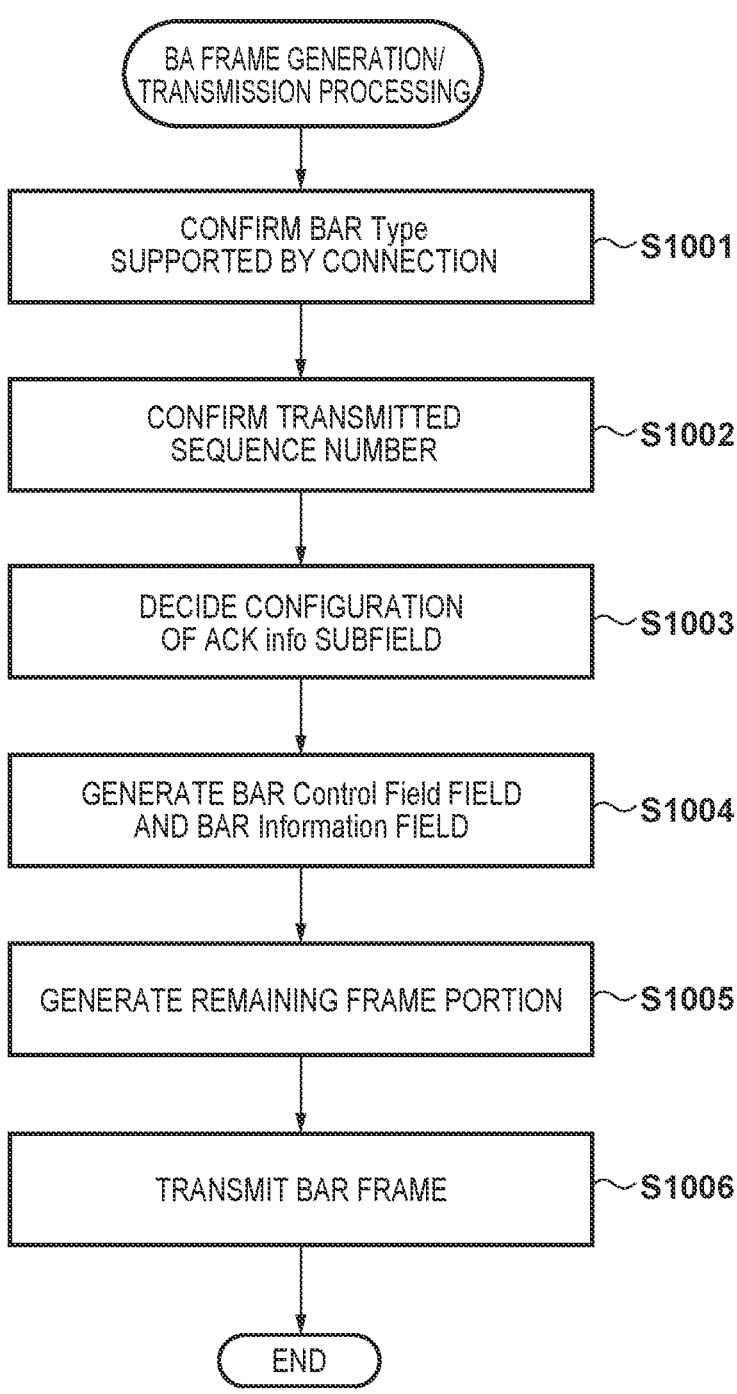

F I G. 11
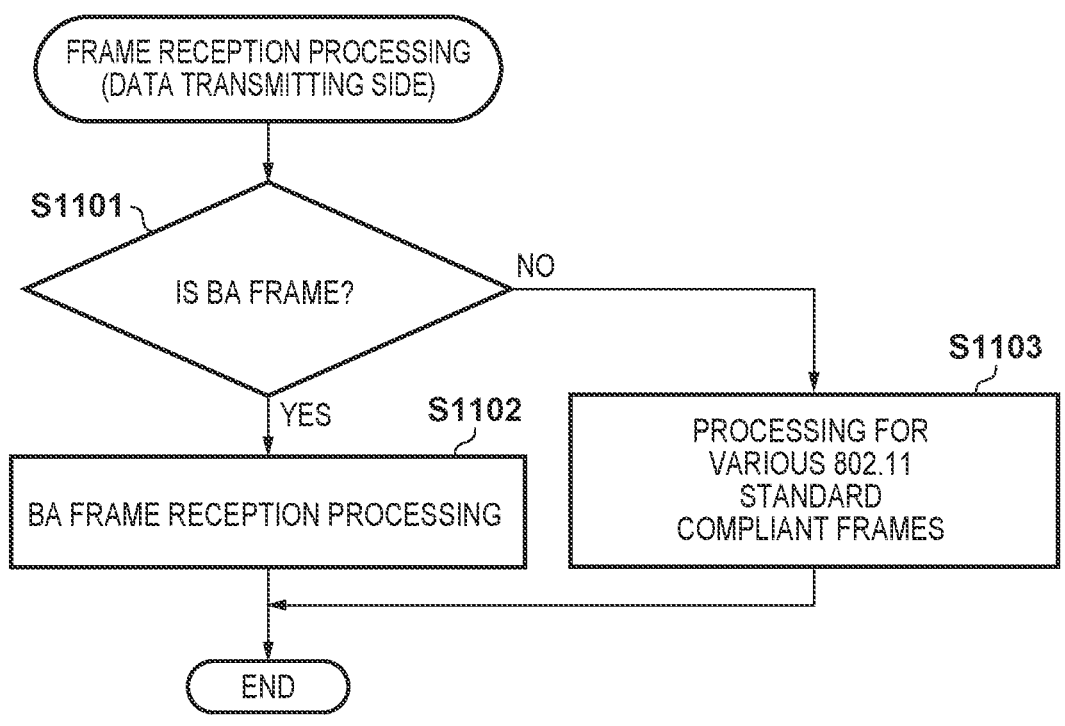

F I G.  12
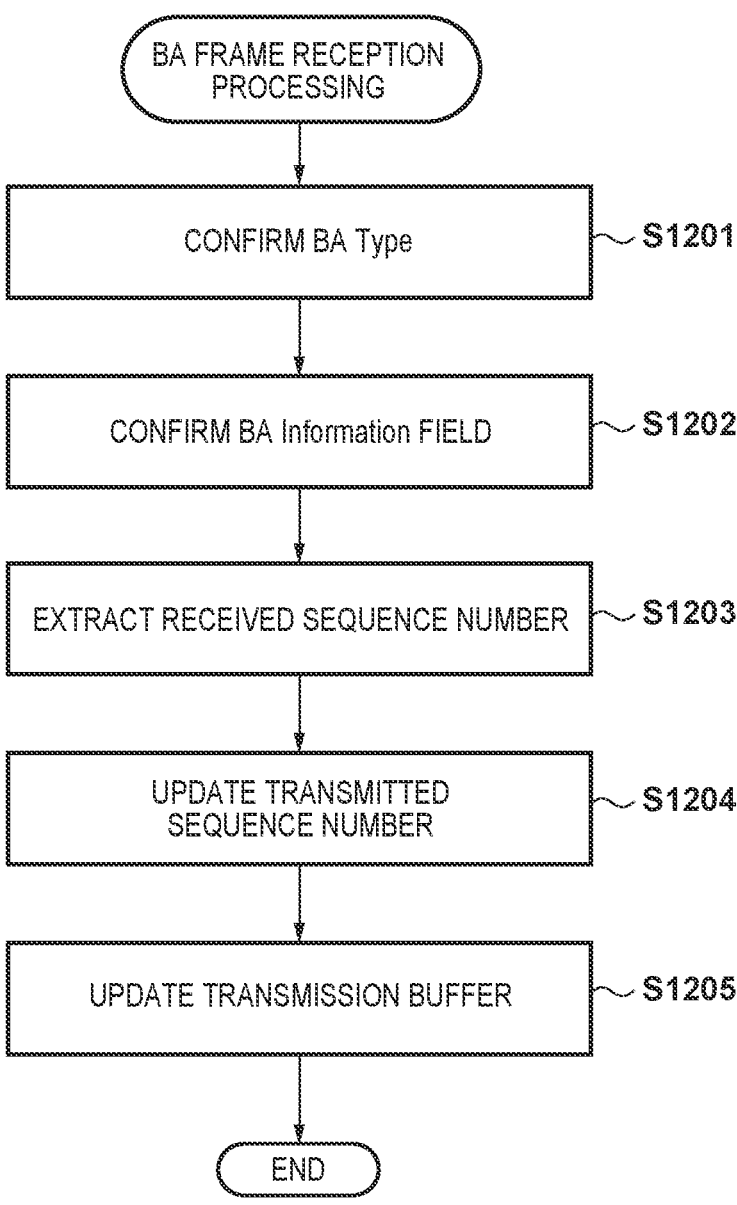

F I G.  14
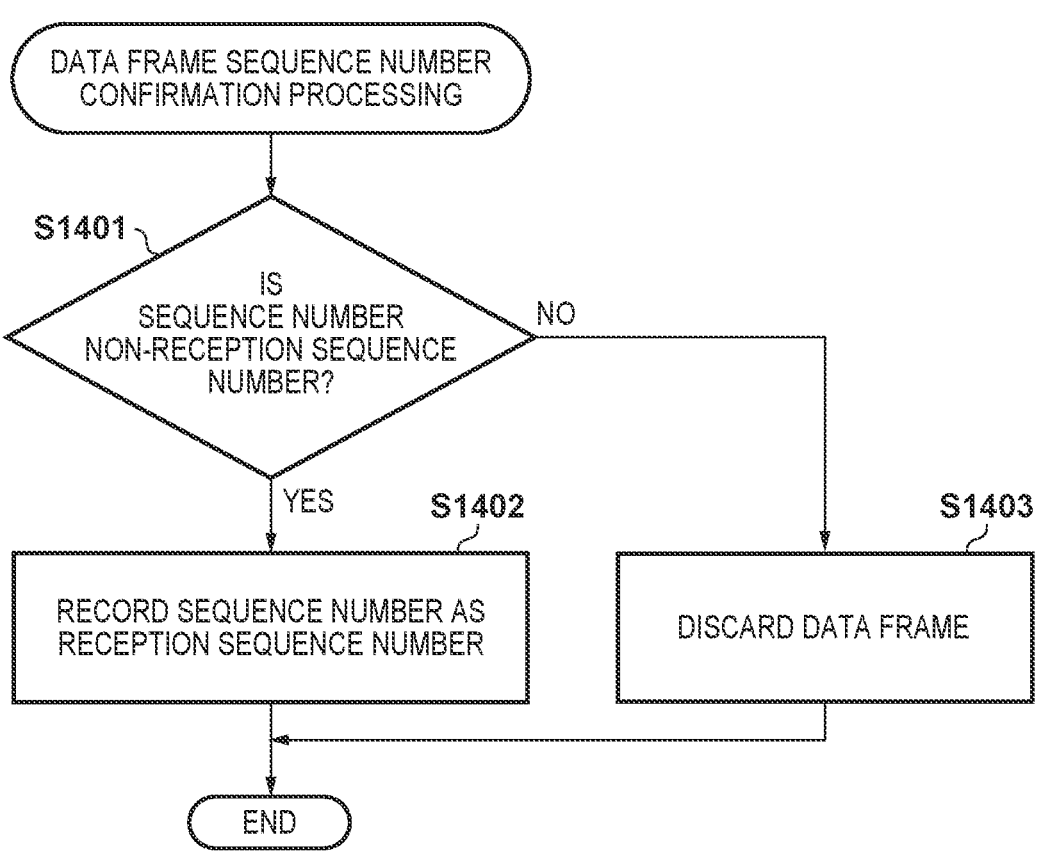

COMMUNICATION APPARATUS AND CONTROL METHOD OF COMMUNICATION APPARATUS

CROSS-REFERENCE TO RELATED APPLICATIONS

This application is a Continuation of International Patent Application No. PCT/JP2021/040508, filed Nov. 4, 2021, which claims the benefit of Japanese Patent Application No. 2020-203656, filed Dec. 8, 2020, both of which are hereby incorporated by reference herein in their entireties.

BACKGROUND OF THE INVENTION

Field of the Invention

The present invention relates to a wireless communication technique.

Background Art

The IEEE802.11 series is known as a wireless LAN (Local Area Network) communication standard defined by IEEE (Institute of Electrical and Electronics Engineers). The IEEE802.11 series standards include the IEEE802.11a/b/g/n/ac/ax standards (PTL 1).

As for reception of a plurality of wireless packets, the IEEE802.11ax standard discloses an extended specification of a BlockAck frame capable of transmitting an acknowledgement (ACK) by one frame. The IEEE802.11ax standard discloses a specification in which the number of MPDUs (MAC (Media Access Control) Protocol Data Unit) expressible by BlockAck Bitmap in a BlockAck frame is extended to up to 256 from 64 expressible by IEEE802.11ac. An increased number of MPDUs for which an acknowledgement can be performed at once implements high throughput.

CITATION LIST

Patent Literature

PTL 1: Japanese Patent Laid-Open No. 2018-50133

To further improve the throughput or frequency use efficiency, IEEE has examined the definition of the IEEE802.11be standard as a new standard of the IEEE802.11 series. The IEEE802.11be standard proposes a method of further extending, to 512 or 1,024, the number of MPDUs for which an acknowledgement can be performed at once. In the IEEE802.11be standard, a Multi-Link communication method of performing communication between a plurality of wireless apparatuses using a plurality of wireless links, and a Multi-AP communication method of connecting a plurality of wireless access points to one wireless terminal and performing communication have been examined A method of an acknowledgement across a plurality of links is also being examined.

When wireless apparatuses communicate using a plurality of links, a transmitting apparatus is assumed to transmit data frames having a different set of sequence numbers on each link. At this time, a receiving apparatus can receive data frames of partially omitted sequence numbers on each link. Conventionally, an acknowledgement method efficient for such a case has not been proposed.

SUMMARY OF THE INVENTION

The present invention has been made to solve the above-described problems, and has as its object to provide a technique for implementing efficient acknowledgement control in communication using a plurality of links.

To achieve the above object, a wireless communication apparatus according to an aspect of the present invention has the following arrangement. That is, there is provided a communication apparatus compliant with the IEEE802.11 standard series, comprising first transmission means for transmitting a plurality of data frames to a communication partner apparatus using a plurality of links, second transmission means for transmitting, to the communication partner apparatus, a request frame that requests an acknowledgement (Ack) frame to the plurality of transmitted data frames, and reception means for receiving the Ack frame from the communication partner apparatus in response to transmitting the request frame, wherein the request frame includes sequence information about sequence numbers of a plurality of data frames transmitted on each link of the plurality of links, and the sequence information includes identification information that identifies at least one data frame group distinguished every series of data frames having consecutive sequence numbers out of the plurality of data frames transmitted on the each link.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 shows an example of the functional arrangement of the communication apparatus (STA or AP).

FIG. 4 is a sequence chart showing a communication sequence for data communication between the AP and the STA.

FIG. 5A shows the configurations of a BlockAck Request frame and BlockAck frame.

FIG. 5B shows the configurations of a BlockAck Request frame and BlockAck frame.

FIG. 5C shows the configurations of a BlockAck Request frame and BlockAck frame.

FIG. 6A shows configuration example 1 of an ACK Info subfield.

FIG. 6B shows configuration example 2 of the ACK Info subfield.

FIG. 8 is a flowchart of frame transmission processing by a data frame transmitting side.

FIG. 10 is a flowchart of BAR frame generation/transmission processing.

FIG. 11 is a flowchart of frame reception processing by the data frame transmitting side.

FIG. 12 is a flowchart of BA frame reception processing.

FIG. 14 is a flowchart of sequence number confirmation processing.

DESCRIPTION OF THE EMBODIMENTS

Figure 1:
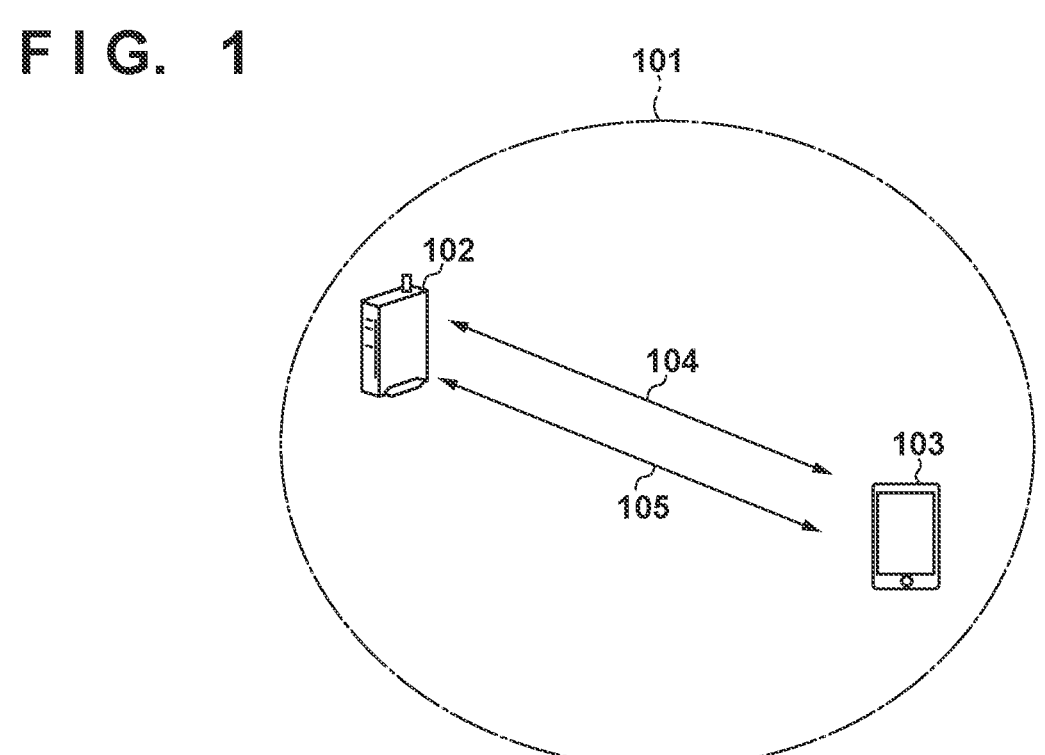
FIG. 1 is a view showing an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a network according to the embodiment. FIG. 1 shows a configuration including one AP (Access Point) (AP 102) and one STA (station/terminal apparatus) (STA 103) as communication apparatuses (wireless communication apparatuses). Note that the description of the embodiment is applicable to both the AP and the STA and is not limited to either of them. As shown in FIG. 1, a circle 101 represents a network formed by the AP 102.

In the embodiment, the STA 103 can transmit/receive a frame to/from the AP 102 via wireless links 104 and 105. The wireless links 104 and 105 can use channels of the 2.4 GHz, 5 GHz, and 6 GHz frequency bands, but a frequency band used is not limited to them and another frequency band such as the 60 GHz band may be used. As the wireless links 104 and 105, channels of the 2.4 GHz and 5 GHz bands may be used in combination in accordance with Capability information of Multi-Link communication of the STA 103 and AP 102, or a plurality of channels may be selected from the 6 GHz band and used in combination. The embodiment is similarly applicable to Multi-AP communication handling communication between a plurality of APs and one STA. The embodiment will be explained by targeting the two wireless links 104 and 105, but the present invention is not limited to this, and the embodiment is also applicable to a case where three or more links are used.

Note that the network configuration shown in FIG. 1 is merely an example, and the following discussion is applicable to a network including many communication apparatuses in a wider area or to various positional relationships between communication apparatuses.

(Arrangement of Communication Apparatus)

Figure 2:
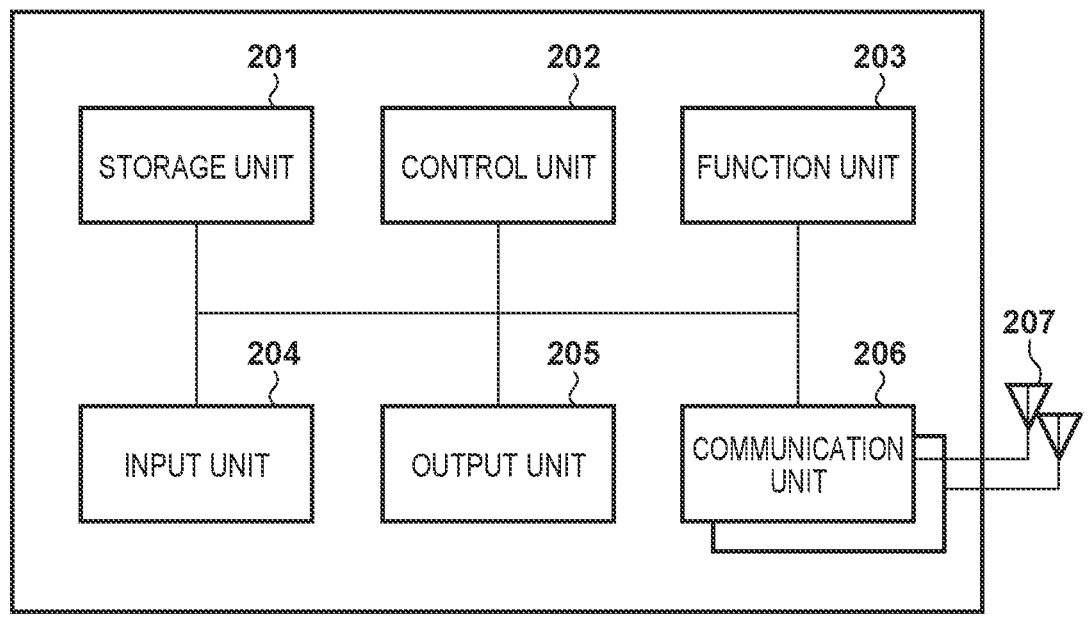
FIG. 2 shows an example of the hardware arrangement of a communication apparatus (STA or AP).

Next, the arrangement of the communication apparatus (AP or STA) according to the embodiment will be explained. FIG. 2 shows an example of the hardware arrangement of the AP according to the embodiment. As an example of the hardware arrangement, the AP includes a storage unit 201, a control unit 202, a function unit 203, an input unit 204, an output unit 205, one or more communication units 206, and one or more antennas 207. Note that the STA also has a hardware arrangement similar to that of the AP, and the following description is applicable to the STA.

The storage unit 201 is formed by both of a ROM (Read Only Memory) and a RAM (Random Access Memory) or one of them, and stores programs for performing various kinds of operations (to be described later) and various kinds of information such as communication parameters for wireless communication. Note that in addition to the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 201.

The control unit 202 is formed by, for example, a processor such as a CPU (Central Processing Unit) or an MPU (Micro Processing Unit), an ASIC (Application Specific Integrated Circuit), a DSP (Digital Signal Processor), an FPGA (Field Programmable Gate Array), or the like. The control unit 202 controls the entire AP by executing the programs stored in the storage unit 201. Note that the control unit 202 may control the entire AP in cooperation with the programs stored in the storage unit 201 and an OS (Operation System).

The control unit 202 controls the function unit 203 to execute predetermined processing such as image capturing, printing, or projection. The function unit 203 is hardware used by the AP to execute predetermined processing. For example, in a case where the AP is a camera, the function unit 203 is an image capturing unit and performs image capturing processing. For example, in a case where the AP is a printer, the function unit 203 is a printing unit and performs printing processing. For example, in a case where the AP is a projector, the function unit 203 is a projection unit and performs projection processing. Data to be processed by the function unit 203 may be data stored in the storage unit 201, or may be data communicated with another communication apparatus via the communication unit 206 (to be described later).

The input unit 204 accepts various operations from a user. The output unit 205 performs various outputs to the user. Here, the output by the output unit 205 includes at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series, or controls IP communication. In the embodiment, the communication unit 206 can perform processing complying with at least the IEEE802.11ax standard. In addition, the communication unit 206 controls the antenna 207 to transmit and receive radio signals for wireless communication. The AP communicates a content such as image data, document data, or video data with another communication apparatus via the communication unit 206.

The antenna 207 is an antenna capable of receiving signals in one of the sub-GHz band, 2.4 GHz band, 5 GHz band, and 6 GHz band. The antenna 207 may be constituted physically by one or more antennas in order to implement MIMO (Multi-Input and Multi-Output) transmission/reception.

In a case where communication is performed using a plurality of links, the AP may include a plurality of communication units 206 and a plurality of antennas 207, as shown in FIG. 2 (as an example, FIG. 2 shows two communication units 206 and two antennas 207). In this case, one communication unit 206 and one antenna 207 may be assigned to every wireless link, or one communication unit 206 and one antenna 207 may be shared between a plurality of wireless links.

FIG. 3 shows an example of the functional arrangement of the AP according to the embodiment. As an example of the functional arrangement, the AP includes a frame analysis unit 301, a frame generation unit 302, a connection management unit 303, and a frame transmission/reception unit 304. Note that the STA also has a functional arrangement similar to that of the AP, and the following description is applicable to the STA.

The frame analysis unit 301 analyzes a frame received from a communication partner apparatus (opposing communication apparatus). The frame generation unit 302 generates a frame (wireless frame) to be transmitted to the communication partner apparatus. The connection management unit 303 manages a connection between the AP and the communication partner apparatus. For example, the connection management unit 303 performs arrangement/agreement (BlockAck Agreement) of BlockAck (BA) during connection and management of the sequence number (Sequence Number) of data with respect to each communication partner apparatus. BlockAck Agreement and Sequence Number are managed for each TID (Traffic Identifier: identifier representing the type of traffic (data)) in connection. The frame transmission/reception unit 304 transmits/receives frames between the AP and the communication partner apparatus via the communication unit 206 and the antenna 207 (FIG. 2).

(Communication Sequence Between AP and STA)

FIG. 4 is a sequence chart showing a communication sequence for data communication between the AP 102 and the STA 103. The processing of the sequence can start in response to turning on the AP 102 and the STA 103, respectively. Alternatively, the processing of the sequence may start when at least either of the AP 102 and STA 103 is instructed by a user or an application to start wireless communication. In the following description, the two wireless links 104 and 105 are formed between the AP 102 and the STA 103, as shown in FIG. 1.

First, in F401, the AP 102 and the STA 103 establish a wireless connection by performing connection processing according to the IEEE802.11 standard. The embodiment is applicable to both a case where no encryption of communication is performed and a case where encryption is performed. In the case where encryption is performed, the embodiment is applicable regardless of a cipher system (security system) such as WEP (Wired Equivalent Privacy), WPA (Wi-Fi Protected Access) 1, WPA2, WPA3, WPS (Wi-Fi Protected Setup), or another system. A connection may be established on only one typical link (for example, the link 104) while secondarily performing a connection of the other link. Alternatively, connections may be established independently on the respective links.

In this example, the AP 102 transmits data to the STA 103. After the connection is established in F401, the AP 102 transmits an ADDBA Request frame to the STA 103 in F402, and receives an ACK frame as an acknowledgement in F403. The STA 103 transmits an ADDBA Response frame to the AP 102 in F404, and receives an ACK frame as an acknowledgement in F405. Upon completion of exchanging the ADDBA Request and the ADDBA Response (processes in F402 to F405), BlockAck Agreement is built between the AP 102 and the STA 103 in regard to data transmission from the AP 102 to the STA 103. BlockAck Agreement may be built independently on each link, or may be built on only one typical link (for example, the link 104) while secondarily building BlockAck Agreement even on the other link.

The BlockAck Agreement will be explained. The ADDBA Request frame and the ADDBA Response frame include a BlockAckPolicy parameter. When a communication apparatus that has received the frame agrees with the parameter, it transmits an ACK frame. The BlockAckPolicy parameter is set to be Immediate (Immediate BlockAck) or Delay (Delayed BlockAck). The example in FIG. 4 shows the Immediate setting. The AP 102 transmits a BlockAck Request (BAR) frame as the request frame, and upon receiving the frame, the STA 103 sends back a BlockAck frame. In contrast, when BlockAckPolicy is set to be Delayed (not shown), the STA 103 sends back an ACK frame (instead of sending back the BlockAck frame in F408). The STA 103 transmits a BlockAck frame in a TXOP (Transmission Opportunity) period obtained later.

The ADDBA Request frame includes various parameters (for example, Starting Sequence Number (start sequence number)) of information (Starting Sequence Control) about the start number of data to be transmitted in one BA session. The initial value of Starting Sequence Number can be decided by exchanging ADDBA Request/Response. Subsequent update of Starting Sequence Number can comply with a method defined by the IEEE802.11 standard.

The ADDBA Request/Response frame can include BA Type/BAR Type supported by the self-apparatus. For example, the frame can include information representing whether New BA/New BAR to be described later with reference to FIGS. 5A to 7C is supported (can also include information representing whether one or more of configuration examples 1 to 7 to be described later are supported). A communication apparatus that has received the frame records and manages BA Type/BAR Type supported by the communication partner apparatus.

In the embodiment, when building BlockAck Agreement, the connection management unit 303 of each of the AP 102 and STA 103 records and manages, in the storage unit 201, various parameters and information described above for the TID.

After building BlockAck Agreement, the AP 102 can transmit a plurality of data frames before receiving an ACK frame from the STA 103 serving as a communication partner apparatus (opposing communication apparatus). For example, the AP 102 transmits a plurality of MPDUs (data frames) in F406 (data transmission processing), and the STA 103 transmits a Block Ack frame in F408 as an acknowledgement of the plurality of MPDUs. As described above, in the example of FIG. 4, Immediate is set in the BlockAckPolicy parameter. After the AP 102 transmits a BlockAck Request frame (F407) (in response to the transmission), the STA 103 sends back a BlockAck frame (F408).

The transmission (F407) of the BlockAck Request frame and the reply (F408) of the BlockAck frame may be executed independently on each link or only on one typical link (for example, the link 104). In this case, information carried on the typical link may include information directed to the other link.

In the example of FIG. 4, the AP 102 transmits a BlockAckRequest frame to the STA 103 in F407. Instead, the AP 102 may set, in Implicit BlockAck Request, an Ack Policy subfield included in a QoS Control field in at least one MPDU among MPDUs in F406. That is, the AP 102 may set, in at least one of the MPDUs, Implicit BlockAck Request (request information) requesting a BlockAck frame of the STA 103. The AP 102 can request a BlockAck frame of the STA 103 without transmitting a BlockAckRequest frame (F407). At this time, the transmission of Implicit BlockAck Request and the reply of the BlockAck frame may be executed independently on each link or only on one typical link (for example, the link 104). In this case, information carried on the typical link may include information directed to the other link.

The BlockAck frame sent back in F408 includes information set based on the sequence number of the data frame transmitted in the data transmission of F406. The conventional 802.11 specifications are premised on consecutive sequence numbers sent by BlockAck frames. For example, according to the specifications, BlockAck Bitmap represents whether a data frame (packet) by the number of bits expressible by BlockAck Bitmap with Starting Sequence Number serving as a start point has been received. In this case, a problem arises when data are transmitted on a plurality of links, like the sequence of FIG. 4. For example, a case where a data transmitting apparatus transmits data of sequence numbers 1 and 3 by the link 104 and data of sequence numbers 2 and 4 by the link 105 will be examined. In this case, a data receiving apparatus cannot receive the data of sequence numbers 2 and 4 on the link 104 and the data of sequence numbers 1 and 3 on the link 105. Thus, the receiving apparatus expresses these sequence numbers as loss frames on BlockAck Bitmap. On each link, data of the sequence numbers expressed as loss frames have been transmitted on the other link, but retransmission processing by the transmitting apparatus may start, and the unnecessary retransmission may consume the band.

In the embodiment, the data transmitting apparatus is configured to operate to transmit at least one data frame set in a BlockAck Request frame or Implicit BlockAck Request including information of the sequence number of data transmitted/untransmitted on each link. Although the BlockAck Request frame will be exemplified below, a similar description is also applicable to Implicit BlockAck Request. The data receiving apparatus is configured to operate to transmit a BlockAck frame including information of the sequence number of data received/unreceived on each link.

(Configurations of BlockAck Request Frame and BlockAck Frame)

Next, the configurations of a BlockAck Request frame and BlockAck frame will be explained. Note that FIG. 4 shows an example of data transmission from the AP 102 to the STA 103, but the following description is similarly applicable to data transmission from the STA 103 to the AP 102.

FIGS. 5A to 5C show the configurations of a BlockAck Request frame and BlockAck frame in the 802.11ax standard. As a description common to FIGS. 5A to 5C, Octets and Bits represent the sizes of respective fields. A field referred to as "variable" means a variable length. A portion referred to as "(R)" in FIGS. 5A to 5C becomes valid for a BlockAck Request frame and invalid for a BlockAck frame. A description of a field having no reference numeral will be omitted.

FIG. 5A shows the configurations of the entire BlockAck Request frame and BlockAck frame. The BlockAck Request frame and BlockAck frame are formed by a MAC header field 501, a BA(R) Control field 502, a BA(R) Information field 503, and a FCS field.

FIG. 5B shows the configuration of the BA(R) Control field 502. The BA(R) Control field 502 is formed by a BA(R) Ack Policy subfield, a BA(R) Type subfield 504, a Reserved subfield 505, and a TID_INFO subfield. The format of the BA(R) Information field 503 is defined in accordance with information set in the BA(R) Type subfield 504. In the IEEE802.11ax standard, BA(R) Type 0, 4, 5, 7 to 9, and 11 to 15 are designated in a Reserved area. In the embodiment, at least one BA(R) Type in the Reserved region is used to define new BA(R) Type. Note that the new BA(R) Type proposed in the embodiment will be called New BA(R).

FIG. 5C shows the configuration of the BA(R) Information field 503 defined in New BA(R). The BA(R) Information field 503 is formed by a BA(R) Subtype subfield 507 and an ACK Info subfield 506. As described in Bits, 0 may be set in the BA(R) Subtype subfield 507. In this case, information equivalent to BA(R) Subtype may be expressed using a Reserved area in the BA(R) Type subfield 504 or a Reserved area in the Reserved subfield 505. Note that the names "BA(R) Subtype" and "ACK Info" presented here are merely examples, and the present invention is not limited to them.

(Configuration of ACK Info Subfield)

Some configuration examples of the ACK Info subfield 506 (sequence information) in FIG. 5C according to the embodiment will be explained with reference to FIGS. 6A to 6C and FIGS. 7A to 7C. Note that the name, size, and storage order of each portion described below are merely examples, and the present invention is not limited to them as long as a similar function is obtained. A BlockAck Request frame transmitted from the AP 102 (data transmitting apparatus) will be exemplified below.

<<Configuration (Configuration Examples 1 to 3) of ACK Info Subfield Representing Transmitted MPDU>>

Figure 6B:
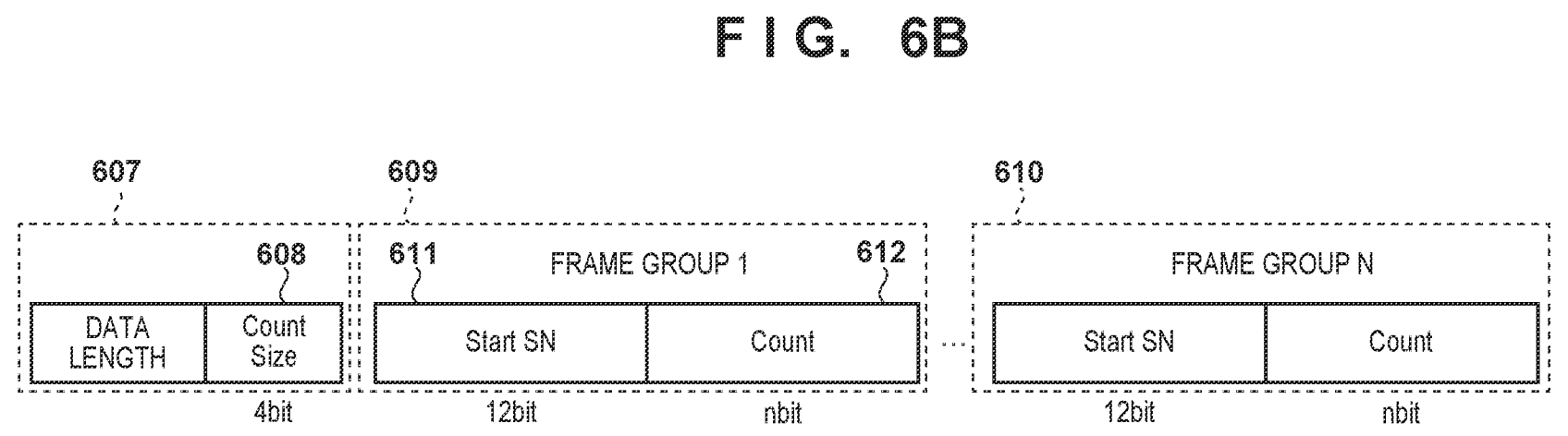
Figure 6C:
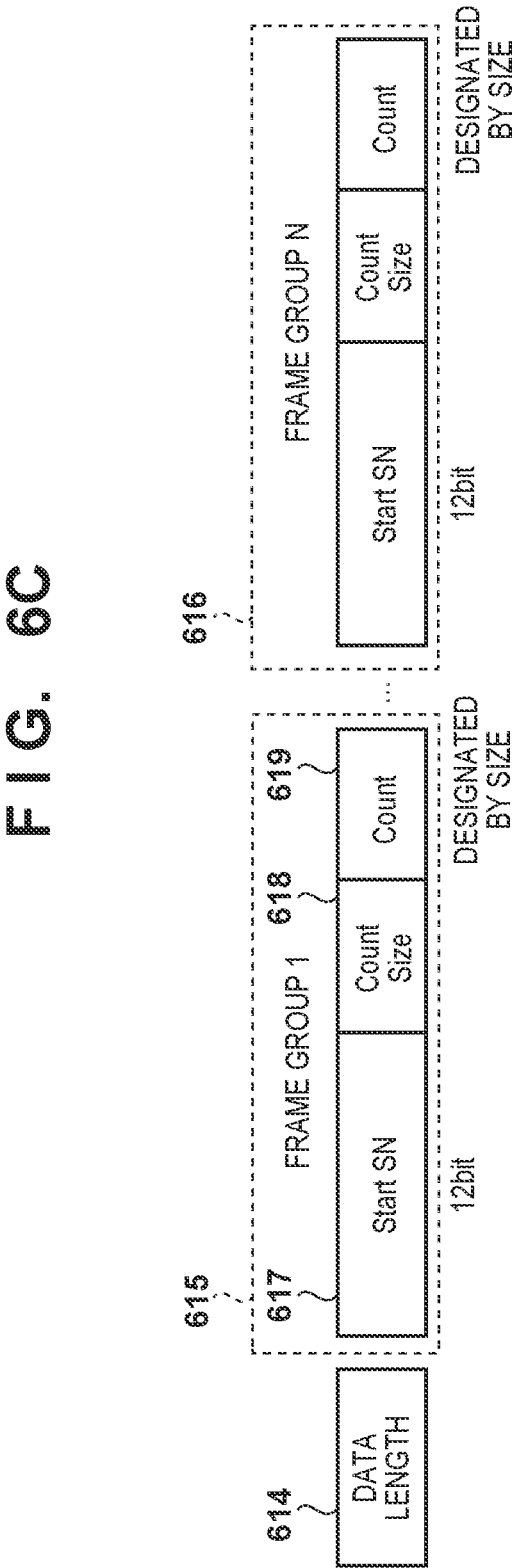
FIG. 6C shows configuration example 3 of the ACK Info subfield.

FIGS. 6A to 6C show configuration examples 1 to 3 of the ACK Info subfield 506. The ACK Info subfield 506 represented in configuration examples 1 to 3 is stored in a BlockAck Request frame. Configuration examples 1 to 3 are configuration examples when information about a MPDU (data frame) transmitted from the AP 102 is transmitted. As a configuration common to configuration examples 1 to 3, the ACK Info subfield 506 is formed by an ACK Info header portion (corresponding to an ACK Info header portion 601, 607, or 614) including meta information of the entire ACK Info, and an ACK Info data portion including identification information (corresponding to a frame group 602, 603, 609, 610, 615, or 616) that identifies a transmitted frame group (data frame group). Note that the names "ACK Info header" and "ACK Info data" mentioned here are merely examples, and the present invention is not limited to them.

The AP 102 distinguishes, as a frame group for each link, data transmitted to the STA 103 for every set of a series of data having consecutive sequence numbers. That is, when an omission occurs in the sequence number of transmitted data, the frame group is divided at this point. Information about all transmitted frame groups is included in the ACK Info subfield 506, thereby providing information about frames for which an acknowledgement is requested of the STA 103. The STA 103 suffices to transmit an acknowledgement for the requested frame. A data length included in the ACK Info header portion may or may not include the data length of the ACK Info header portion.

Configuration Example 1

FIG. 6A shows configuration example 1 of the ACK Info subfield 506. The ACK Info header portion 601 in configuration example 1 includes information representing a data length (data length of information designating all subsequent frame groups) included in the ACK Info data portion. This information can be information representing the end of a data frame group. As a method of representing a data length, the data length of a subsequent ACK Info portion can be stored by bits, bytes, or the number of frame groups (24 bits per frame group in this example). Note that the present invention is not limited to this method as long as a data length can be represented.

In IEEE802.11, Sequence Number (sequence number) is expressed by 12 bits and a value of 0 to 4095. In configuration example 1, a start sequence number (Start SN) 604 and an end sequence number (End SN) 605 in each frame group are used as a method of expressing the frame groups 602 and 603. Each of the start sequence number 604 and the end sequence number 605 can be expressed by 12 bits, respectively. The start sequence number 604 represents the sequence number of a MPDU corresponding to the start of each received frame group. The end sequence number 605 represents the sequence number of a MPDU corresponding to the end of each transmitted frame group.

Configuration Example 2

FIG. 6B shows configuration example 2 of the ACK Info subfield 506. Similar to configuration example 1, the ACK Info header portion 607 in configuration example 2 includes information representing a data length included in the ACK Info data portion. As a method of representing a data length, the data length of a subsequent ACK Info portion can be stored by bits, bytes, or the number of frame groups (12 bits per frame group+the number of bits represented by a Count Size portion 608 in this example). Note that the present invention is not limited to this method as long as a data length can be represented. In configuration example 2, the ACK Info header portion 607 further includes the Count Size portion 608. The Count Size portion 608 represents the size of a Count portion (corresponding to a Count portion 612) in the frame group 609 or 610.

In configuration example 2, a start sequence number (Start SN) 611 and the Count portion 612 in each frame group are used as a method of expressing the frame groups 609 and 610. Similar to configuration example 1, the start sequence number 611 represents the sequence number of a MPDU corresponding to the start of each transmitted frame group. The Count portion 612 holds information representing the number of transmitted MPDUs having consecutive sequence numbers starting from the start sequence number 611. If the size of the Count portion designated by the Count Size portion 608 is small, the maximum number of MPDUs expressible as a frame group becomes small, but a data length necessary to express one frame group can be decreased. To the contrary, if the size of the Count portion designated by the Count Size portion 608 is large, the maximum number of MPDUs expressible as a frame group can be increased, but a data length necessary to express one frame group becomes large. A Count Size used is not limited in this example. The start sequence number can be expressed by 12 bits.

In this configuration example, the upper limit of the number of MPDUs expressible in one frame group is defined by the Count Size portion 608. Thus, even MPDUs having consecutive sequence numbers are sometimes expressed as separate frame groups.

Configuration Example 3

FIG. 6C shows configuration example 3 of the ACK Info subfield 506. Similar to configuration example 1, the ACK Info header portion 614 in configuration example 3 includes information representing a data length included in the ACK Info data portion. As a method of representing a data length, the data length of a subsequent ACK Info portion can be stored by bits, bytes, or the number of frame groups (16 bits per frame group+the number of bits represented by the Count Size portion of each frame in this example). Note that the present invention is not limited to this method as long as a data length can be represented. In configuration example 3, a start sequence number (Start SN) 617, a Count Size portion 618, and a Count portion 619 in each frame group are used as a method of expressing the frame groups 615 and 616. The Count Size portion 608 stored in the ACK Info header portion 607 in configuration example 2 is stored as the Count Size portion 618 in each frame group. A proper Count Size can be set in each frame group without fixing the Count Size at the header portion. A proper Count Size can be set by setting a large Count Size when the number of frames to be expressed in a frame group is large, or a small Count Size when the number of frames to be expressed is small.

Figure 7A:
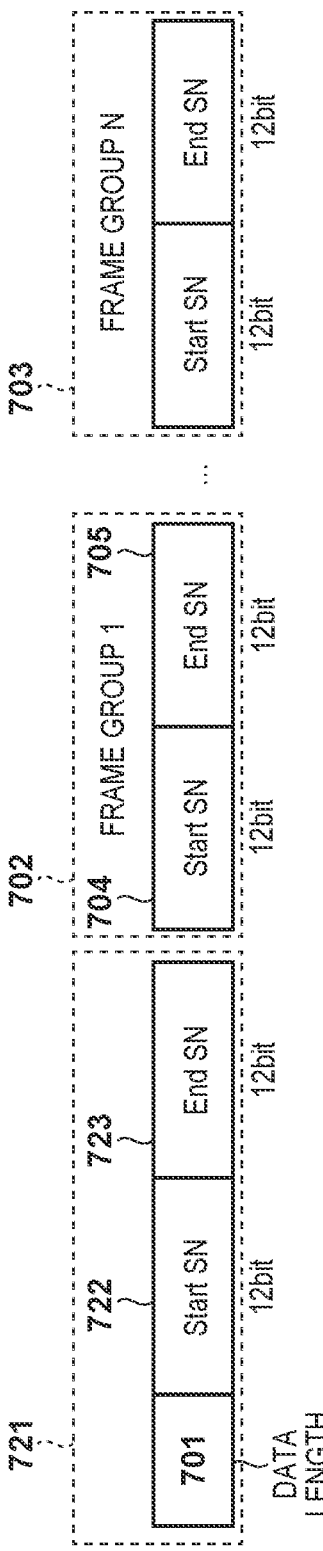
FIG. 7A shows configuration example 4 of the ACK Info subfield.
Figure 7B:
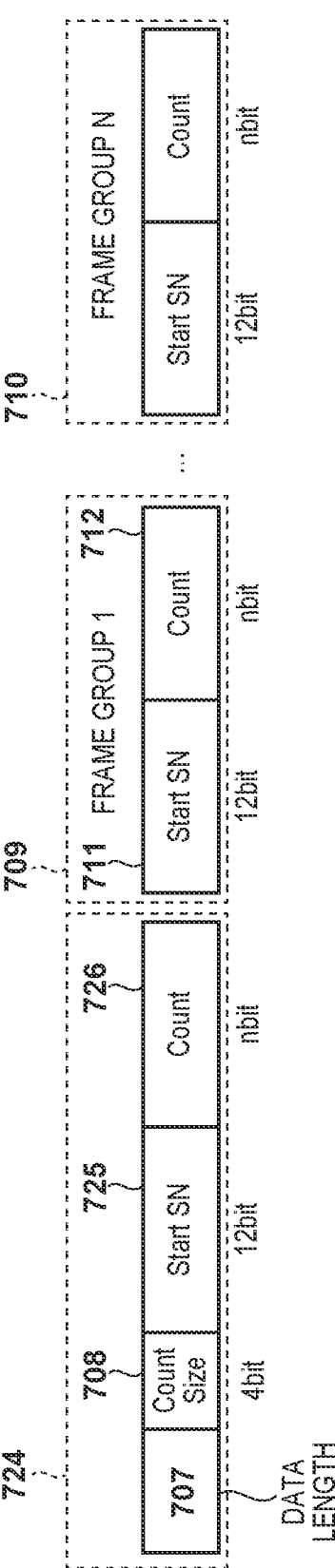
FIG. 7B shows configuration example 5 of the ACK Info subfield.
Figure 7C:
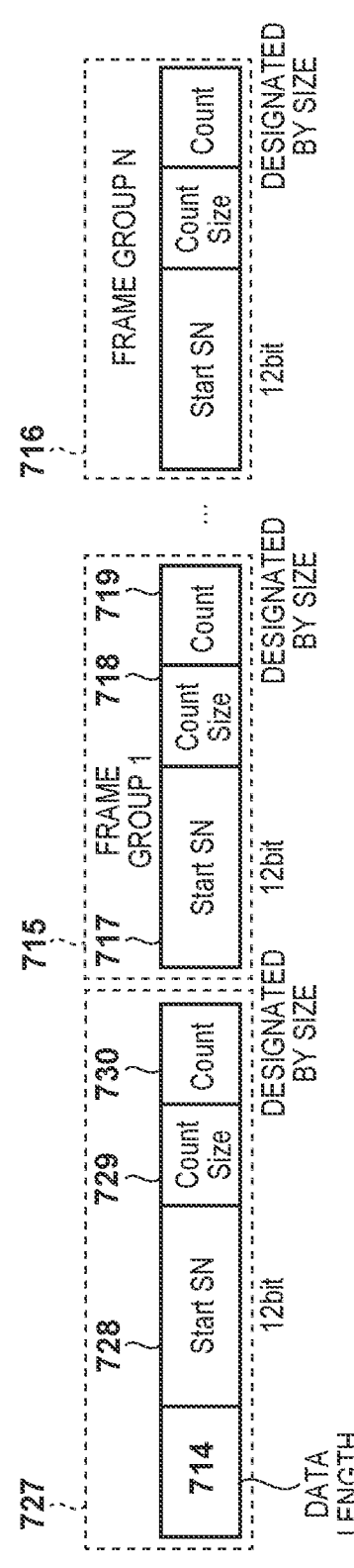
FIG. 7C shows configuration example 6 of the ACK Info subfield.

Configuration (Configuration Examples 4 to 6) of ACK Info Subfield Representing Untransmitted MPDU FIGS. 7A to 7C show configuration examples 4 to 6 of the ACK Info subfield 506. The ACK Info subfield 506 represented in configuration examples 4 to 6 is stored in a BlockAck Request frame transmitted from a data frame transmitting side. Configuration examples 4 to 6 are configuration examples when the STA 103 transmits information about a MPDU not transmitted from the AP 102. As a configuration common to configuration examples 4 to 6, the ACK Info subfield 506 is formed by an ACK Info header portion (corresponding to an ACK Info header portion 721, 724, or 727) including meta information of the entire ACK Info, and an ACK Info data portion including identification information (corresponding to a frame group 702, 703, 709, 710, 715, or 716) that identifies a transmitted frame group (data frame group). Note that the names "ACK Info header" and "ACK Info data" mentioned here are merely examples, and the present invention is not limited to them.

The AP 102 distinguishes, as a frame group, data not transmitted to the STA 103 for every set of a series of data having consecutive sequence numbers. That is, when an omission occurs in the sequence number of untransmitted data, the frame group is divided at this point. Information about a frame for which an acknowledgement is requested of the STA 103 can be provided by setting, in the ACK Info subfield 506, information about all untransmitted frame groups. The STA 103 suffices to transmit an acknowledgement for the requested frame.

Configuration examples 4 to 6 differ from configuration examples 1 to 3 in that the ACK Info header portion includes information representing the start and end sequence numbers of a frame group newly transmitted to the ACK Info data portion. In configuration examples 4 to 6, the ACK Info data portion includes information about an untransmitted MPDU, so only this information cannot identify the range of sequence numbers of MPDUs that have been transmitted. The sequence numbers of transmitted MPDUs can be identified by combining information representing the start and end sequence numbers of frame groups expressed by the entire ACK Info subfield 506, and the sequence number of an untransmitted MPDU. A data length included in the ACK Info header portion may or may not include the data length of the ACK Info header portion.

Configuration Example 4

FIG. 7A shows configuration example 4 of the ACK Info subfield 506. The ACK Info header portion 721 in configuration example 4 includes information 701 representing a data length included in the ACK Info data portion. This information can be information representing the end of a data frame group. As a method of representing a data length, the data length of a subsequent ACK Info portion can be stored by bits, bytes, or the number of frame groups (24 bits per frame group in this example). Note that the present invention is not limited to this method as long as a data length can be represented.

In IEEE802.11, Sequence Number (sequence number) is expressed by 12 bits and a value of 0 to 4095. In configuration example 4, a start sequence number (Start SN) 704 and an end sequence number (End SN) 705 in each frame group are used as a method of expressing the frame groups 702 and 703. Each of the start sequence number 704 and the end sequence number 705 can be expressed by 12 bits, respectively. The start sequence number 704 represents the sequence number of a MPDU corresponding to the start of each untransmitted frame group. The end sequence number 705 represents the sequence number of a MPDU corresponding to the end of an untransmitted frame group. In configuration example 4, the ACK Info header portion 721 includes a start sequence number 722 and end sequence number 723 of a transmitted frame group.

Configuration Example 5

FIG. 7B shows configuration example 5 of the ACK Info subfield 506. Similar to configuration example 4, the ACK Info header portion 607 in configuration example 5 includes information representing a data length included in the ACK Info data portion. As a method of representing a data length, the data length of a subsequent ACK Info portion can be stored by bits, bytes, or the number of frame groups (12 bits per frame group+the number of bits represented by a Count Size portion 708 in this example). Note that the present invention is not limited to this method as long as a data length can be represented. In configuration example 5, the ACK Info header portion 724 further includes the Count Size portion 708. The Count Size portion 708 represents the size of a Count portion (corresponding to a Count portion 712) in the frame group 709 or 710, and further the size of a Count portion 726 included in the ACK Info header portion 724.

In configuration example 5, a start sequence number (Start SN) 711 and the Count portion 712 in each frame group are used as a method of expressing the frame groups 709 and 710. Similar to configuration example 4, the start sequence number 711 represents the sequence number of a MPDU corresponding to the start of an untransmitted frame group. The Count portion 712 holds information representing the number of untransmitted MPDUs having consecutive sequence numbers starting from the start sequence number 711. If the size of the Count portion designated by the Count Size portion 708 is small, the maximum number of MPDUs expressible as a frame group becomes small, but a data length necessary to express one frame group can be decreased. To the contrary, if the size of the Count portion designated by the Count Size portion 708 is large, the maximum number of MPDUs expressible as a frame group can be increased, but a data length necessary to express one frame group becomes large. A Count Size used is not limited in this example. The start sequence number can be expressed by 12 bits.

In this configuration example, the upper limit of the number of MPDUs expressible in one frame group is defined by the Count Size portion 708. Thus, even MPDUs having consecutive sequence numbers are sometimes expressed as separate frame groups.

In this configuration example, the ACK Info header portion 724 includes a start sequence number 725 of a transmitted frame group, and the Count portion 726 meaning the total number (number) of MPDUs from the start sequence number 725 to an end sequence number. The size of the Count portion 726 in the ACK Info header portion 724 is not defined by the Count Size portion 708 and is fixed at 12 bits, or a Count Size portion representing information of the Count portion 726 may be separately held in the ACK Info header portion.

Configuration Example 6

FIG. 7C shows configuration example 6 of the ACK Info subfield 506. Similar to configuration example 4, the ACK Info header portion 727 in configuration example 6 includes information representing a data length included in the ACK Info data portion. As a method of representing a data length, the data length of a subsequent ACK Info portion can be stored by bits, bytes, or the number of frame groups (16 bits per frame group+the number of bits represented by the Count Size portion of each frame in this example). Note that the present invention is not limited to this method as long as a data length can be represented. In configuration example 6, a start sequence number (Start SN) 717, a Count Size portion 718, and a Count portion 719 in each frame group are used as a method of expressing the frame groups 715 and 716. The Count Size portion 708 stored in the ACK Info header portion 607 in configuration example 5 is stored in each frame group. A proper Count Size can be set in each frame group without fixing the Count Size at the header portion. A proper Count Size can be set by setting a large Count Size when the number of frames to be expressed in a frame group is large, or a small Count Size when the number of frames to be expressed is small.

In this configuration example, the ACK Info header portion 727 includes a start sequence number 728 of a transmitted frame group, a Count portion 730 meaning the total number of MPDUs from the start sequence number 728 to an end sequence number, and a Count Size portion 729 representing size information of the Count portion 730.

Configuration Example 7

Configuration example 7 is a configuration in which the Compressed BlockAck Variant format used in BA Type: Compressed defined by the 802.11 standard is diverted. In this configuration, Fragment Number (4 bits), Starting Sequence Number (12 bits), and Block Ack Bitmap (8 or 32 bytes) are stored in the ACK Info subfield 506 (sequence information). The size of Block Ack Bitmap and the maximum number of MSDUs/A-MSDUs expressible at once are determined in accordance with the Fragment Number value and comply with the 802.11ax standard. Starting Sequence Number has a value representing the start sequence number of a transmitted data frame (MPDU), and expresses whether subsequent data frames with the start sequence number serving as a start point have been transmitted in correspondence with each bit of Block Ack Bitmap. It can be determined that a frame having bit "1" has been transmitted and a frame having bit "0" has not been transmitted. "0" and "1" may have reverse meanings.

Configuration examples 1 to 7 have been described by exemplifying a BlockAck Request frame transmitted from the AP 102 (data transmitting apparatus), but a configuration based on the above-described configurations is also applicable to a BlockAck frame transmitted from the STA 103 (data receiving apparatus). For example, as for configuration examples 1 to 3, "transmitted frame (group)" in the description of configuration examples 1 to 3 above may be rewritten into "received frame (group)" as the configuration of an ACK Info subfield representing a received MPDU. As for configuration examples 4 to 6, "untransmitted frame (group)" and "transmitted frame (group)" in the description of configuration examples 4 to 6 above may be rewritten into "unreceived frame (group)" and "received frame (group)", respectively, as the configuration of an ACK Info subfield representing an unreceived MPDU. As for configuration example 7, a value representing the start sequence number of a received data frame (MPDU) may be set in Starting Sequence Number. In addition, a reception result with respect to a data frame transmitted from the data transmitting apparatus may be set at each bit of Block Ack Bitmap. An example of processing regarding a BA frame in the use of configuration example 7 will be described later.

Configurations based on configuration examples 1 to 6 above are also applicable to a data frame set in Implicit BlockAck Request. For example, the configurations of configuration examples 1 to 6 are similarly applied to a BAR Control field and a BAR Information field in the data frame.

(Notification Method of Configuration of ACK Info Subfield)

The transmitting side of a BlockAck Request frame can identify (designate), in the frame, one of configuration examples 1 to 7 with which the ACK Info subfield 506 is constituted, and notify the receiving side of it. For example, one of configuration examples 1 to 7 to be used can be identified using at least one of the BAR Type subfield 504, the Reserved subfield 505, and the BAR Subtype subfield 507.

For example, BAR Type® meaning Reserved in the BAR Type subfield 504 may be defined as BAR Type meaning which one of configuration examples 1 to 7 is used. Further, one of configuration examples 1 to 7 to be used may be identified using at least three bits in another Reserved area of the BAR Type subfield 504, the Reserved subfield 505, or the BAR Subtype subfield 507. More specifically, in a case where the BAR Subtype subfield 507 is used, it may be defined that when bits "0000" are designated in the BAR Subtype subfield 507, configuration example 1 is used, and when bits "0001" is designated, configuration example 2 is used.

Alternatively, one of configuration examples 1 to 7 to be used may be identified by combining the existing BAR Type subfield 504 and a predetermined (sub)field. For example, a case where the BAR Type subfield 504 is set to be Multi-TID or Multi-STA will be assumed. When the BAR Type subfield 504 is set to be Multi-TID, one of configuration examples 1 to 7 to be used may be identified using the area of the Reserved subfield 505.

The standard may be defined to essentially represent whether a communication partner apparatus supports New BAR according to the embodiment (that is, the configuration of the ACK Info subfield 506 in configuration examples 1 to 7) (whether it has capability information corresponding to the New BAR Type). Alternatively, in the example of FIG. 4, the AP 102 and the STA 103 may exchange capability information through exchange of ADDBA Request/Response frames (at the time of building BlockAck Agreement). Alternatively, the capability may be negotiated through exchange of other management frames. More specifically, the AP 102 and the STA 103 can negotiate using, for example, a Reserved bit in ADDBA Capabilities Field in ADDBA Extension Element at the time of building Block-Ack Agreement (see FIG. 4). Note that the negotiation is not limited to this method. Whether to support New BAR, which is decided by the negotiation, can be recorded as a BlockAck Agreement attribute in the connection management unit 303.

Note that the notification method of the configuration of an ACK Info subfield by the transmitting side of a BlockAck Request frame has been described above, but a similar description is applicable to the notification method of the configuration of an ACK Info subfield on the transmitting side of a BlockAck frame. In this case, "BAR" in the above description may be rewritten into "BA". Also, in a case where a data frame set in Implicit BlockAck Request is used, the configuration of an ACK Info subfield can be announced using a BAR Control field or a BAR Information field in the data frame.

<Processing on Data Frame Transmitting Side>

Next, processing on a data frame transmitting side will be described with reference to FIGS. 8 to 12. A case where an apparatus on the data frame transmitting side is the AP 102 as in FIG. 4 will be exemplified. However, this description is similarly applicable to a case where the STA 103 is the operation entity.

(Frame Transmission Processing)

Frame transmission processing by a data frame transmitting side according to the embodiment will be described with reference to FIG. 8. FIG. 8 is a flowchart of frame transmission processing by the data frame transmitting side. The processing can start after the AP 102 establishes a wireless connection to a communication partner apparatus (STA 103 in the example of FIG. 4) and ends exchange of ADDBA Request/Response frames.

As described above, when building BlockAck Agreement (F402 to F405 in FIG. 4), the connection management unit 303 of each of the AP 102 and STA 103 records and manages, in the storage unit 201, various parameters such as Starting Sequence Number in the BA session. Further, the connection management unit 303 of each of the AP 102 and STA 103 records and manages, in the storage unit 201, information of BA Type (that can also include a new BA(R) by New BA(R) Type according to the embodiment) supported by the communication partner apparatus.

When the frame generation unit 302 of the AP 102 generates a frame to the communication partner apparatus (STA 103), the frame transmission/reception unit 304 starts frame transmission processing. As the frame transmission processing, first, the frame transmission/reception unit 304 determines whether the frame to be transmitted is a data frame (S801). This can be determined by, for example, confirming whether a Type field in Frame Control Field included in a MAC header in a MAC frame format defined by the IEEE802.11 standard is "10". It can be determined that the frame to be transmitted is a data frame if the Type field is "10"; otherwise, is not a data frame.

If it is determined that the frame to be transmitted is a data frame (YES in S801), the frame transmission/reception unit 304 executes data frame generation/transmission processing (S802). Details of the processing in S802 will be described later with reference to FIG. 9. After the processing in S802, the frame generation unit 302 determines whether to generate and transmit a BlockAck Request (BAR) frame (S803). This may be determined in accordance with, for example, the cumulative number of data frames (MPDUs) after the frame transmission/reception unit 304 finally receives a BlockAck frame, or according to another rule.

If the frame generation unit 302 determines to generate and transmit a BAR frame (YES in S803), the frame generation unit 302 transmits the BAR frame, the frame transmission/reception unit 304 executes BAR frame generation/transmission processing (S804), and then the processing ends. Details of the processing in S804 will be described later with reference to FIG. 10. If the frame generation unit 302 determines not to generate a BAR frame (NO in S803), the AP 102 ends the frame transmission processing.

If it is determined that the frame to be transmitted is not a data frame (NO in S801), the AP 102 executes processing corresponding to various frames complying with the IEEE802.11 standard (S805), and the processing ends. The processing in S805 is hardly related to the embodiment, and a description thereof will be omitted.

(Data Frame Generation/Transmission Processing)

Figure 9:
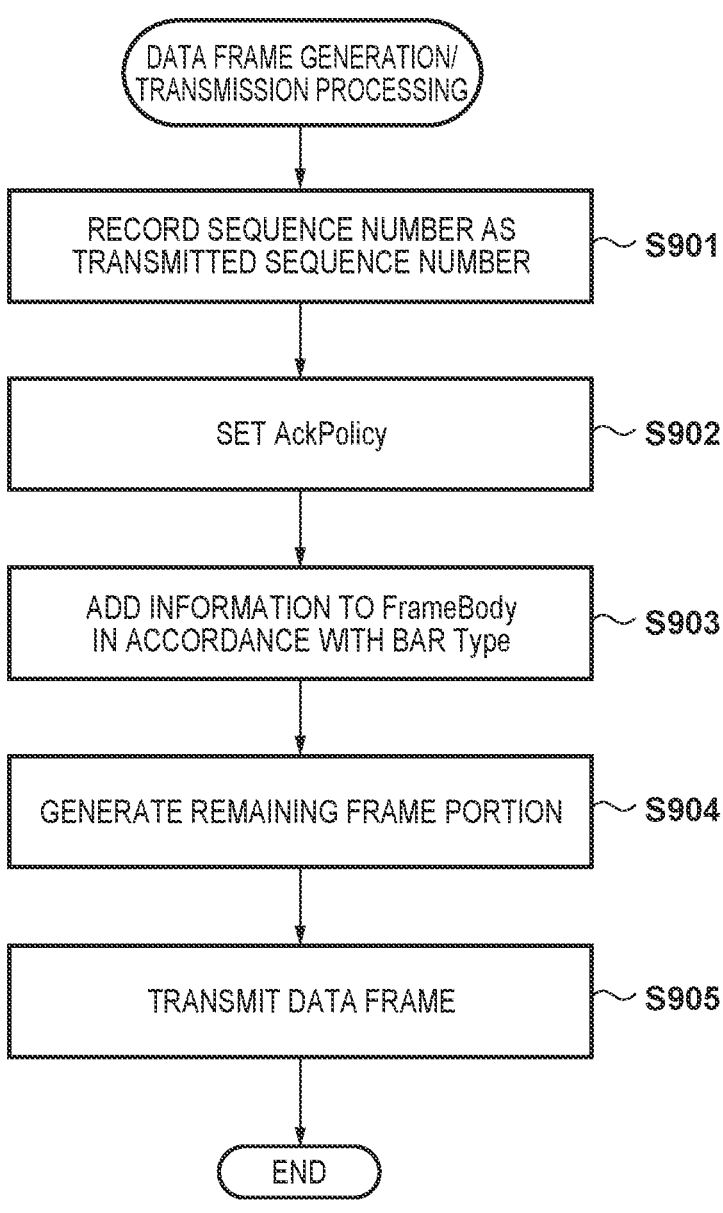
FIG. 9 is a flowchart of data frame generation/transmission processing.

Next, an example of data frame generation/transmission processing in S802 will be explained with reference to FIG. 9. FIG. 9 is a flowchart of data frame generation/transmission processing. Note that the sequence number of a data frame (MPDU) is represented by Sequence Number in a Sequence Control field included in a MAC header in a MAC frame format defined by the IEEE802.11 standard, and has a value ranging from 0 to 4095.

The connection management unit 303 of the AP 102 records and manages, as "transmitted" (as a transmitted sequence number) in the storage unit 201, the sequence number of a data frame to be transmitted by the frame transmission/reception unit 304 (S901). By using the number information, the connection management unit 303 can determine whether data having an arbitrary sequence number has been transmitted. As for a sequence number managed by the connection management unit 303, when a wireless connection is established (F401 in the example of FIG. 4), management of the transmission sequence number regarding the connection starts. At the start of management, all sequence numbers "0" to "4095" are recorded as non-transmission sequence numbers in the storage unit 201. Note that the sequence number of a frame to be transmitted first may start from 0, but the present invention is not limited to this. When the sequence number reaches 4095, the sequence number of the next frame returns to 0.

Then, the frame generation unit 302 sets Ack Policy (sets an Ack Policy subfield in a QoS Control field) (S902). For example, support of New BAR can be represented using Bit5 and Bit6 of the QoS Control field. For example, when it is confirmed that the AP 102 and the STA 103 support New BAR at the time of building BlockAck Agreement, the frame generation unit 302 can set Bit5:1 and Bit6:0 in the QoS Control field. By representing the support of New BAR, it can be represented that Implicit BlockAck Request is set in the data frame.

After setting Ack Policy, information is added to Frame Body in accordance with BAR Type supported by the AP 102 and the STA 103 (S903). For example, when Bit5:1 and Bit6:0 are set in the QoS Control field, as described above, the frame generation unit 302 can set, in Frame Body, information that identifies a transmitted/untransmitted sequence number, which has been described with reference to FIGS. 6A to 6C and FIGS. 7A to 7C. In this case, the STA 103 on the receiving side can analyze the Frame Body and extract information of the sequence number of data transmitted from the AP 102. When the STA 103 receives a data frame including such Ack Policy, it can send back a Block-Ack frame without receiving a BlockAck Request frame. Then, the frame generation unit 302 generates a remaining frame portion, completing the data frame (S904). Finally, the frame transmission/reception unit 304 transmits the data frame generated by the frame generation unit 302 to the communication partner apparatus (STA 103) (S905).

(BAR Frame Generation/Transmission Processing)

Next, BAR frame generation/transmission processing in S804 will be explained with reference to FIG. 10. FIG. 10 is a flowchart of BAR frame generation/transmission processing. As described above, the connection management unit 303 of each of the STA 103 and AP 102 records and manages, in the storage unit 201, information such as BAR Type (that can also include New BAR Type according to the embodiment) supported by the communication partner apparatus. As for generation of a frame, FIGS. 5A to 5C will be referred to.

The connection management unit 303 of the AP 102 confirms BAR Type supported by the connection (supported by the AP 102 and the STA 103) (S1001). Here, the AP 102 and the STA 103 support New BAR and in other cases, processing compliant with the IEEE802.11 standard can be performed. Then, the connection management unit 303 confirms a transmitted sequence number (S1002).

The frame generation unit 302 generates a BAR frame using the pieces of information confirmed in S1001 and S1002. First, the frame generation unit 302 decides the configuration of the ACK Info subfield 506 in the BA(R) Information field 503 (S1003). At this time, the frame generation unit 302 can decide the configuration of the ACK Info subfield 506 based on the supported BAR Type confirmed in S1001. When the confirmed supported BAR Type represents that one of configuration examples 1 to 7 is supported, the frame generation unit 302 can decide to use one of configuration examples 1 to 7 as the configuration of the ACK Info subfield 506. Note that the use of one of configuration examples 1 to 7 may be permanently set in advance in the AP 102, or set (decided) by an input operation by a user via the input unit 204.

Then, the frame generation unit 302 generates the BA(R) Control field 502 and the BA(R) Information field 503 in accordance with the configuration of the ACK Info subfield 506 decided in S1003 so as to identify (designate) the configuration (S1004). As described above, one of configuration examples 1 to 7 to be used for the ACK Info subfield 506 can be designated by various subfields in the BA(R) Control field 502/BA(R) Information field 503. The frame generation unit 302 generates the BA(R) Information field 503 based on the transmitted sequence number confirmed in S1002. As for the detailed contents of the BAR Information field, the sequence number confirmed in S1002 is expressed by one of the formats described in configuration examples 1 to 7.

Subsequently, the frame generation unit 302 generates a remaining frame portion, completing the BAR frame (S1005). Finally, the frame transmission/reception unit 304 transmits the BAR frame generated by the frame generation unit 302 to the communication partner apparatus (STA 103).

(Frame Reception Processing)

Next, frame reception processing on the data frame transmitting side according to the embodiment will be explained with reference to FIG. 11. FIG. 11 is a flowchart of frame reception processing. When the frame transmission/reception unit 304 of the AP 102 receives a wireless frame from the communication partner apparatus (STA 103), the frame analysis unit 301 starts analysis processing of the received frame. When the frame is not directed to the self-apparatus or the frame is broken (for example, the FCS value is invalid), the frame may be discarded without starting the processing.

As the frame analysis processing, the frame analysis unit 301 first determines whether the received frame is a BA (BlockAck) frame (S1101). This can be determined by, for example, confirming whether a Type field in Frame Control Field included in a MAC header in a MAC frame format defined by the IEEE802.11 standard is "01" and a Subtype field is "1001". It can be determined that the frame is a BlockAck frame if the Type field is "01" and the Subtype field is "1001"; otherwise, is not a BA frame.

If it is determined that the received frame is a BA frame (YES in S1101), the AP 102 executes BA frame processing (S1102). The BA frame reception processing in S1102 will be described with reference to FIG. 12. If it is determined that the received frame is not a BA frame (NO in S1101), the AP 102 executes processing corresponding to various frames complying with the IEEE802.11 standard (S1103), and the processing ends. The processing in S1103 is hardly related to the embodiment, and a description thereof will be omitted.

(BA Frame Reception Processing)

Next, BA frame reception processing in S1102 will be explained with reference to FIG. 12. FIG. 12 is a flowchart of BA frame reception processing. As described above, the connection management unit 303 of each of the STA 103 and AP 102 records and manages, in the storage unit 201, information such as BA Type (that can also include New BA Type according to the embodiment) supported by the communication partner apparatus. As for generation of a frame, FIGS. 5A to 5C will be referred to.

The connection management unit 303 of the AP 102 confirms BA Type supported by the connection (supported by the AP 102 and the STA 103) (S1201). This information is confirmed and recorded by the connection management unit 303 at the time of building BlockAck Agreement. The AP 102 can switch subsequent processing in accordance with the confirmed BA Type.

Then, the connection management unit 303 of the AP 102 confirms the BA(R) Information field 503 included in the received BA frame (S1202). The format of the BA(R) Information field 503 is changeable in accordance with BA Type. The connection management unit 303 extracts, from information included in the field, a sequence number (received sequence number) recorded as "received" by the STA 103 (S1203). For example, when BA Type is Compressed, the BA(R) Information field 503 can include BlockAck Starting Sequence Control and Block Ack Bitmap. A sequence number recorded as "received" can be calculated from the start point of the reception sequence number and Bitmap representing reception/non-reception of each sequence number.

Then, the connection management unit 303 updates the managed transmitted sequence number (S1204). The AP 102 need not retransmit a frame, reception of which has been confirmed by the STA 103 in S1203, and need not perform management of "transmitted". Thus, the connection management unit 303 cancels the record of the transmission. After that, the connection management unit 303 may delete, from the transmission buffer, the frame whose record of the transmission has been canceled in S1204 (S1205).

<Processing on Data Frame Receiving Side>

Figure 13:
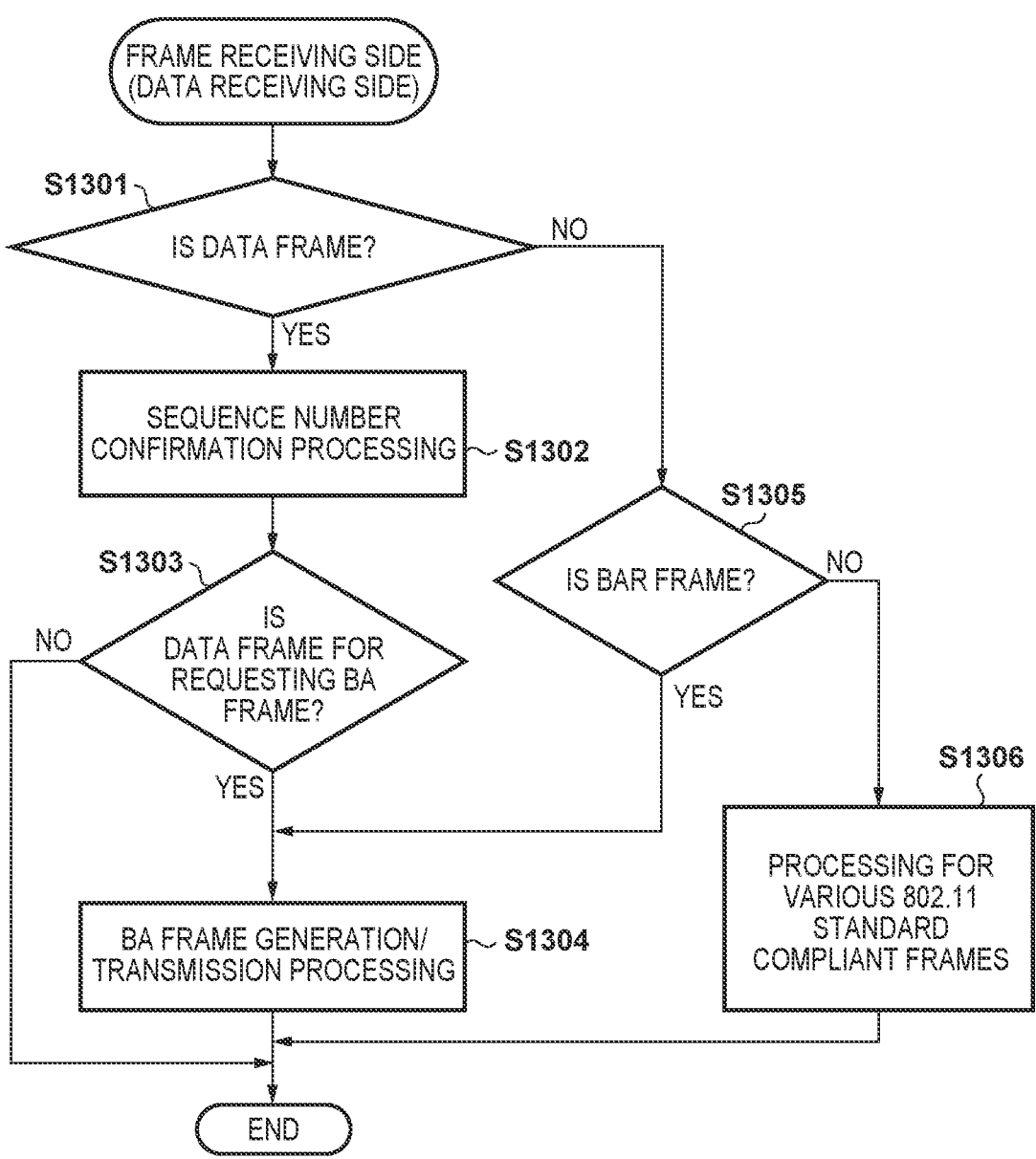
FIG. 13 is a flowchart of frame reception processing by a data frame receiving side.
Figure 15:
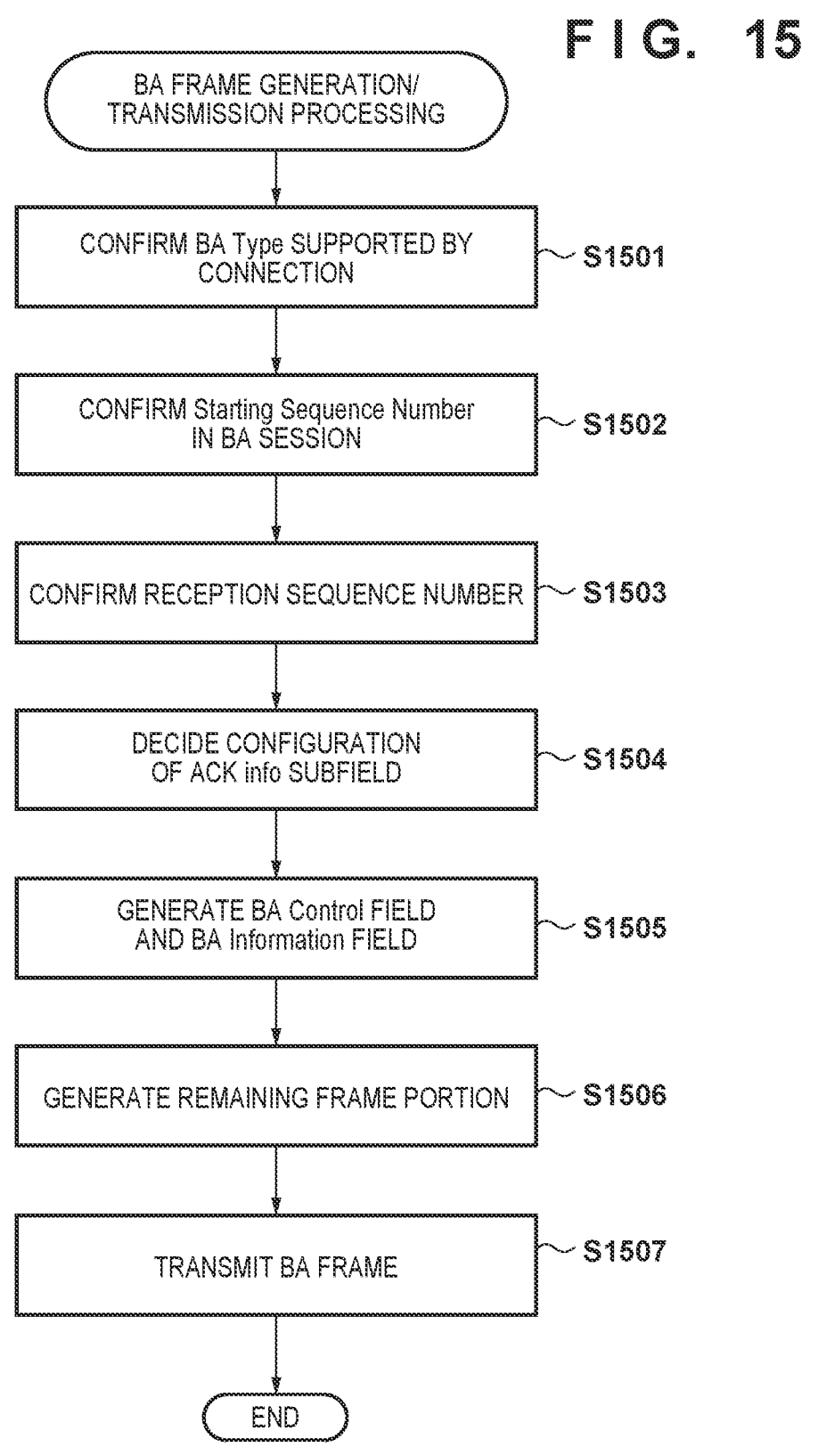
FIG. 15 is a flowchart of BA frame generation/transmission processing.

Next, processing on the data frame receiving side will be described with reference to FIGS. 13 to 15. A case where an apparatus on the data frame receiving side is the STA 103 as in FIG. 4 will be exemplified. However, this description is similarly applicable to a case where the AP 102 is the operation entity. As described above, the descriptions about the BAR Control field 502 and the BA(R) Information field 503 with respect to a BAR frame are applicable to the BA Control field 502 and the BA(R) Information field 503, respectively, and a detailed description thereof will be omitted.

(Frame Reception Processing)

Frame reception processing by the data frame receiving side according to the embodiment will be described with reference to FIG. 13. FIG. 13 is a flowchart of frame reception processing by the data frame receiving side. The processing can start after the STA 103 establishes a wireless connection to a communication partner apparatus (AP 102 in the example of FIG. 4) and ends exchange of ADDBA Request/Response frames.

As described above, when building BlockAck Agreement (F402 to F405 in FIG. 4), the connection management unit 303 of each of the STA 103 and AP 102 records and manages, in the storage unit 201, various parameters such as Starting Sequence Number in the BA session. Further, the connection management unit 303 of each of the STA 103 and AP 102 records and manages, in the storage unit 201, information of BA Type (that can also include New Type according to the embodiment) supported by the communication partner apparatus.

When the frame transmission/reception unit 304 of the STA 103 receives a wireless frame from the communication partner apparatus (AP 102), the frame analysis unit 301 starts analysis processing of the received frame. When the frame is not directed to the self-apparatus or the frame is broken (for example, the FCS value is invalid), the STA 103 may discard the frame without starting the processing.

As the frame analysis processing, the frame analysis unit 301 first determines whether the received frame is a data frame (S1301). This can be determined by, for example, confirming whether a Type field in Frame Control Field included in a MAC header in a MAC frame format defined by the IEEE802.11 standard is "10". It can be determined that the frame is a data frame if the Type field is "10"; otherwise, is not a data frame.

If it is determined that the received frame is a data frame (YES in S1301), the connection management unit 303 executes confirmation processing of the sequence number of the data frame (S1302). Details of the processing in S1302 will be described with reference to FIG. 14. After the processing in S1302, the frame analysis unit 301 determines whether the received frame is a data frame requesting a BlockAck frame (S1303). This can be determined by, for example, confirming whether an Ack Policy subfield included in a QoS Control field in at least one or more MPDUs out of MPDUs included in the data frame is set to be Implicit BlockAck Request ("00"). If the Ack Policy subfield is set to be "00", the frame analysis unit 301 determines that the received frame is a data frame requesting the BlockAck frame (YES in S1303), and the process advances to S1304. If the Ack Policy subfield is not set to be "00", the frame analysis unit 301 determines that the received frame is not a data frame requesting the BlockAck frame, and the frame reception processing ends. In S1304, the AP 102 performs BlockAck (BA) frame generation/transmission processing. Details of the processing in S1304 will be described with reference to FIG. 15.

If it is determined in S1301 that the received frame is not a data frame (NO in S1301), the frame analysis unit 301 determines whether the received frame is a BAR (BlockAck Request) frame (S1305). For example, when the above-described Type field in the data frame is "01" and a Subtype field in Frame Control Field in the MAC header is "1000", the received frame can be identified as a BAR frame. If the frame analysis unit 301 determines that the received frame is a BAR frame (YES in S1305), the process advances to S1304, and the STA 103 executes BA frame generation/transmission processing. The BAR frame can include information about the start number of data. If it is determined in S1305 that the received frame is not a BAR frame (NO in S1305), the STA 103 executes processing corresponding to various frames complying with the IEEE802.11 standard (S1306), and the process ends. The processing in S1306 is hardly related to the embodiment, and a description thereof will be omitted.

(Confirmation Processing of Sequence Number of Data Frame)

Next, confirmation processing of the sequence number of a data frame in S1302 will be described with reference to FIG. 14. FIG. 14 is a flowchart of confirmation processing of the sequence number of a data frame. Note that the sequence number of a data frame (MPDU) is represented by Sequence Number in a Sequence Control field included in a MAC header in a MAC frame format defined by the IEEE802.11 standard, and has a value ranging from 0 to 4095. When a wireless connection is established (F401 in the example of FIG. 4), the connection management unit 303 starts management of a reception sequence number (sequence number of a received data frame) regarding the connection. At the start of management, all sequence numbers of 0 to 4095 are recorded in the storage unit 201 as non-reception sequence numbers (sequence numbers of data frames not recorded as "received").

The connection management unit 303 of the STA 103 confirms whether the sequence number of the data frame (MPDU) is a non-reception sequence number (S1401). That is, the connection management unit 303 collates information of the sequence number of the received data frame with reception sequence numbers recorded in the storage unit 201, and determines whether the sequence number of the received data frame is a non-reception sequence number.

If the sequence number of the received data frame is a non-reception sequence number (YES in S1401), the connection management unit 303 newly records the sequence number as a reception sequence number in the storage unit 201 (S1402), and the processing ends. If the sequence number of the received data frame is a reception sequence number (NO in S1401), the received data frame has already been received and is regarded as a redundant frame, the data frame is discarded (S1403), and the processing ends.

(BA Frame Generation/Transmission Processing)

Next, BlockAck (BA) frame generation/transmission processing in S1304 will be explained with reference to FIG. 15. FIG. 15 is a flowchart of BA frame generation/transmission processing. As described above, the connection management unit 303 of each of the STA 103 and AP 102 records and manages, in the storage unit 201, information such as BA Type (that can also include New BA Type according to the embodiment) supported by the communication partner apparatus, and Starting Sequence Number in the BA session. As for generation of a frame, FIGS. 5A to 5C will be referred to.

The connection management unit 303 of the STA 103 confirms BA Type supported by a connection (supported by the STA 103 and the AP 102) (S1501). In accordance with the support situation of the confirmed BA Type, the frame generation unit 302 can decide the content of a BlockAck frame to be generated in S1504 and S1505. Then, the connection management unit 303 of the STA 103 confirms Starting Sequence Number in the BA session (S1502). As described above, the initial value of Starting Sequence Number can be decided at the time of building BlockAck Agreement, and the value can be updated later according to a method defined by the IEEE802.11 standard. Subsequently, the connection management unit 303 confirms a reception sequence number (sequence number recorded as "received") (S1503).

The frame generation unit 302 generates a BlockAck frame using the information confirmed in S1501 to S1503. First, the frame generation unit 302 decides the configuration of the ACK Info subfield 506 in the BA(R) Information field 503 (S1504). The frame generation unit 302 can decide the configuration of the ACK Info subfield 506 based on the supported BA Type confirmed in S1501. When the confirmed supported BA Type represents support of one of configuration examples 1 to 7, the frame generation unit 302 can decide to use one of configuration examples 1 to 7 as the configuration of the ACK Info subfield 506. Note that the use of one of configuration examples 1 to 7 may be permanently set in advance in the STA 103, or set (decided) by an input operation by a user via the input unit 204. Alternatively, the frame generation unit 302 may decide one of configuration examples 1 to 7 to be used, so as to configure the ACK Info subfield 506 with a smallest data size in accordance with the reception situation of the sequence number confirmed in S1503.

Then, the frame generation unit 302 generates the BA Control field 502 and the BA(R) Information field 503 in accordance with the configuration of the ACK Info subfield 506 decided in S1504 so as to identify (designate) the configuration (S1505). As described above, one of configuration examples 1 to 7 to be used for the ACK Info subfield 506 can be designated by various subfields in the BA Control field 502/BA(R) Information field 503.

Subsequently, the frame generation unit 302 generates the MAC header field 501 and FSC field shown in FIG. 5A to complete the frame as a MAC frame, and also generates a PHY portion to complete the BlockAck frame (S1506). Finally, the frame transmission/reception unit 304 transmits, to the communication partner apparatus (AP 102), the BlockAck frame generated by the frame generation unit 302 (S1507).

An acknowledgement of the transmitted frame, and retransmission processing when no acknowledgement is received in a predetermined time are executed according to the IEEE802.11 standard. When the STA 103 normally transmits the BlockAck frame and receives an acknowledgement from the AP 102, it resets the record of the reception. For example, the connection management unit 303 of the STA 103 resets the record of the reception as for a sequence number, the notification of which has been completed by the BlockAck frame, out of managed reception sequence numbers. When sequence numbers make a circuit, they can be managed.

(BA Frame in Configuration Example 7)

An example of a BA frame in configuration example 7 and an example of processing using the frame will be explained. Note that a case where an apparatus on the data frame transmitting side is the AP 102 as in FIG. 4 will be exemplified. However, this description is similarly applicable to a case where the STA 103 is the operation entity. As for generation of a frame, FIGS. 5A to 5C will be referred to.

The STA 103 can obtain the sequence number of a data frame transmitted from the AP 102 from BAR Information (information set in the BA(R) Information field 503) in a BAR frame. The STA 103 can efficiently use Bitmap bits by using the sequence number of the transmitted data frame to associate the sequence number and each bit expressed by BlockAckBitmap in the ACK Info subfield 506.

As described above in regard to configuration example 7, BA Information (information set in the BA(R) Information field 503) stores Fragment Number (4 bits), Starting Sequence Number (12 bits), and Block Ack Bitmap (8 or 32 bytes). The size of Block Ack Bitmap and the maximum number of MSDUs/A-MSDUs expressible at once are determined in accordance with the Fragment Number value and comply with the 802.11ax standard. Starting Sequence Number has a value representing the start sequence number of a frame transmitted from an AP (communication partner apparatus) that is presented in BAR Information. As for subsequent frames, whether a sequence number has been transmitted in association with each bit of Block Ack Bitmap is expressed only for a sequence number presented as "transmitted" in BAR Information by the AP 102. It can be determined that a frame having bit "1" has been transmitted and a frame having bit "0" has not been transmitted. "0" and "1" may have reverse meanings.

More specifically, an example in which the AP 102 presents in BAR Information that it has transmitted sequence numbers 1, 3, and 5, and the STA 103 has received only sequence number 3 will be assumed. In this case, the STA 103 sets Starting Sequence Number to be 1 and Fragment Number to be 0 in BA Information included in a BlockAck frame, and sets the BlockAck Bitmap length to be minimum 8 bytes. In BlockAck Bitmap, the first bit corresponds to sequence number 1, the second bit corresponds to sequence number 3, and the third bit corresponds to sequence number 5. Subsequent bits are not used, but 0 can be set as "non-reception". In this example, sequence numbers 1 and 5 represent a reception success and sequence number 3 represents a reception failure, so a BlockAck frame including the content "101" as BlockAck Bitmap is transmitted from the STA 103 to the AP 102. The AP 102 receives the BlockAck frame, collates it with BAR Information transmitted from the AP 102, and can identify a frame in which respective bits match. In this example, sequence number 3 is regarded as a transmission failure, and retransmission processing is performed.

An acknowledgement of the transmitted frame, and retransmission processing when no acknowledgement is received in a predetermined time are executed according to the IEEE802.11 standard. When the STA 103 normally transmits the BlockAck frame and receives an acknowledgement from the AP 102, it resets the record of the reception. For example, the connection management unit 303 of the STA 103 resets the record of the reception as for a sequence number, the notification of which has been completed by the BlockAck frame, out of managed reception sequence numbers. When sequence numbers make a circuit, they can be managed.

Note that the sequences of the processes shown in FIGS. 8 to 15 are merely examples of implementing the proposal, and the order of the processes is not limited as long as the same functions are obtained. Processes not described in the processing sequences comply with those defined in the IEEE802.11 standard.

According to the present invention, efficient acknowledgement control in communication using a plurality of links is implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus compliant with the IEEE802.11 standard series, comprising:

a communication unit configured to transmit and receive radio signals for wireless communication, at least one processor, and at least one memory coupled to the at least one processor and having instructions stored thereon, and when executed by the at least one processor, causing the communication apparatus to:

transmit a first plurality of data frames on a first link and a second plurality of data frames on a second link to a communication partner apparatus;

transmit, to the communication partner apparatus, a first request frame that requests a first acknowledgement (Ack) frame to the first plurality of transmitted data frames and a second request frame that requests a second Ack frame to the second plurality of transmitted data frames; and receive the first and second Ack frames from the communication partner apparatus in response to transmitting the first and second request frames, wherein the first request frame includes first sequence information about sequence numbers of the first plurality of data frames transmitted on the first link and the second request frame includes second sequence information about sequence numbers of the second plurality of data frames transmitted on the second link, the first sequence information includes identification information that identifies at least one data frame group included in the first plurality of data frames transmitted on the first link, and the second sequence information includes identification information that identifies at least one data frame group included in the second plurality of data frames transmitted on the second link, each of the at least one data frame group comprises a series of data frames and the series of data frames has consecutive sequence numbers, and the identification information includes, for one Traffic Identifier, a plurality of combinations of start sequence number information and end sequence number information for each of the series of data frames within each of the first and second pluralities of data frames.

2. The communication apparatus according to claim 1, wherein the identification information includes information of a start sequence number of a series of data frames, and information of the number of consecutive sequence numbers starting from the start sequence number to an end sequence number of the series of data frames in each data frame group transmitted on the each link.

3. The communication apparatus according to claim 1, wherein the identification information includes information of a start sequence number of a series of data frames, information of the number of consecutive sequence numbers starting from the start sequence number to an end sequence number of the series of data frames, and information representing a size of the information of the number in each data frame group transmitted on the each link.

4. The communication apparatus according to claim 1, wherein the sequence information includes information representing an end of the at least one data frame group transmitted on the each link.

5. The communication apparatus according to claim 4, wherein the information representing the end of the at least one data frame group is represented by one of a bit unit, a byte unit, and the number of data frame groups.

6. A communication apparatus compliant with the IEEE802.11 standard series, comprising:

a communication unit configured to transmit and receive radio signals for wireless communication, at least one processor, and at least one memory coupled to the at least one processor and having instructions stored thereon, and when executed by the at least one processor, causing the communication apparatus to:

receive a first plurality of data frames transmitted using a first link and a second plurality of data frames transmitted using a second link from a communication partner apparatus;

receive, from the communication partner apparatus, first sequence information about sequence numbers of the first plurality of data frames transmitted on the first links and second sequence information about sequence numbers of the second plurality of data frames transmitted on the second link; and transmit a first acknowledgement (Ack) frame to the first plurality of received data frames and a second Ack frame to the second plurality of received data frames, wherein the first sequence information includes identification information that identifies at least one data frame group included in the first plurality of data frames transmitted on the first link, and the second sequence information includes identification information that identifies at least one data frame group included in the second plurality of data frames transmitted on the second link, each of the at least one data frame group comprises a series of data frames and the series of data frames has consecutive sequence numbers, the identification information includes, for one Traffic Identifier, a plurality of combinations of start sequence number information and end sequence number information for each of the series of data frames within each of the first and second pluralities of data frames, and each of the first and second Ack frame includes a reception result with respect to a data frame included in each of the at least one data frame group transmitted on each of the first and second link that is identified by the identification information.

7. The communication apparatus according to claim 6, wherein the identification information includes information of a start sequence number of a series of data frames and information of an end sequence number in each data frame group transmitted on the each link.

8. A method of controlling a communication apparatus compliant with the IEEE802.11 standard series, comprising:

transmitting a first plurality of data frames on a first link and a second plurality of data frames on a second link to a communication partner apparatus;

transmitting, to the communication partner apparatus, a first request frame that requests a first acknowledgement (Ack) frame to the first plurality of transmitted data frames and a second request frame that requests a second Ack frame to the second plurality of transmitted data frames; and receiving the first and second Ack frames from the communication partner apparatus in response to transmitting the first and second request frames, wherein the first request frame includes first sequence information about sequence numbers of the first plurality of data frames transmitted on the first link and the second request frame includes second sequence information about sequence numbers of the second plurality of data frames transmitted on the second link, the first sequence information includes identification information that identifies at least one data frame group included in the first plurality of data frames transmitted on the first link, and the second sequence information includes identification information that identifies at least one data frame group included in the second plurality of data frames transmitted on the second link, each of the at least one data frame group comprises a series of data frames and the series of data frames has consecutive sequence numbers, and the identification information includes, for one Traffic Identifier, a plurality of combinations of start sequence number information and end sequence number information for each of the series of data frames within each of the first and second pluralities of data frames.

9. A method of controlling a communication apparatus compliant with the IEEE802.11 standard series, comprising:

receiving a first plurality of data frames transmitted using a first link and a second plurality of data frames transmitted using a second link from a communication partner apparatus;

receiving, from the communication partner apparatus, first sequence information about sequence numbers of the first plurality of data frames transmitted on the first link and second sequence information about sequence numbers of the second plurality of data frames transmitted on the second link; and transmitting a first acknowledgement (Ack) frame to the first plurality of received data frames and a second Ack frame to the second plurality of received data frames, wherein the first sequence information includes identification information that identifies at least one data frame group included in the first plurality of data frames transmitted on the first link, and the second sequence information includes identification information that identifies at least one data frame group included in the second plurality of data frames transmitted on the second link, each of the at least one data frame group comprises a series of data frames and the series of data frames has consecutive sequence numbers, the identification information includes, for one Traffic Identifier, a plurality of combinations of start sequence number information and end sequence number information for each of the series of data frames within each of the first and second pluralities of data frames, and each of the first and second Ack frame includes a reception result with respect to a data frame included in each of the at least one data frame group transmitted on each of the first and second link that is identified by the identification information.

\* \* \* \* \*